(12) United States Patent
Perlstein et al.

(10) Patent No.: US 10,467,133 B2
(45) Date of Patent: Nov. 5, 2019

(54) STORAGE DEVICE INCLUDING NONVOLATILE MEMORY DEVICE AND GARBAGE COLLECTION METHOD THEREOF

(71) Applicant: SAMSUNG ELECTRONICS CO., LTD., Suwon-si, Gyeonggi-Do OT (KR)

(72) Inventors: Amitai Perlstein, Tel Aviv (IL); Eun Chu Oh, Hwaseong-si (KR); Amir Bennatan, Raanana (IL); Junjin Kong, Yongin-si (KR); Hong Rak Son, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 173 days.

(21) Appl. No.: 15/064,185

(22) Filed: Mar. 8, 2016

(65) Prior Publication Data

US 2016/0267004 A1   Sep. 15, 2016

(30) Foreign Application Priority Data

Mar. 9, 2015 (KR) .................. 10-2015-0032481

(51) Int. Cl.
*G06F 12/02* (2006.01)

(52) U.S. Cl.
CPC ...... *G06F 12/0246* (2013.01); *G06F 12/0253* (2013.01); *G06F 2212/7205* (2013.01)

(58) Field of Classification Search
CPC ..... G06F 12/0246–0276; G06F 2212/70–7211
See application file for complete search history.

(56) References Cited

U.S. PATENT DOCUMENTS

| | | | |
|---|---|---|---|
| 7,518,931 B2 | 4/2009 | Shim | |
| 7,679,133 B2 | 3/2010 | Son et al. | |
| 7,804,718 B2 | 9/2010 | Kim | |
| 8,553,466 B2 | 10/2013 | Han et al. | |
| 8,559,224 B2 | 10/2013 | Han et al. | |
| 8,559,235 B2 | 10/2013 | Yoon et al. | |
| 8,654,587 B2 | 2/2014 | Yoon et al. | |
| 8,769,191 B2 | 7/2014 | Yun et al. | |
| 2011/0029715 A1* | 2/2011 | Hu | G06F 12/0246 711/103 |
| 2011/0199825 A1* | 8/2011 | Han | G11C 16/10 365/185.11 |
| 2011/0233648 A1 | 9/2011 | Seol et al. | |

(Continued)

FOREIGN PATENT DOCUMENTS

KR   1020130042780   4/2013

*Primary Examiner* — Nicholas J Simonetti
(74) *Attorney, Agent, or Firm* — F. Chau & Associates, LLC

(57) ABSTRACT

A storage device is provided as follows. A nonvolatile memory device includes blocks, each block having sub-blocks erased independently. A memory controller performs a garbage collection operation on the nonvolatile memory device by selecting a garbage collection victim sub-block among the sub-blocks and erasing the selected garbage collection victim sub-block to generate a free sub-block. The memory controller selects the garbage collection victim sub-block using valid page information of each sub-block and valid page information of memory cells adjacent to each sub-block.

18 Claims, 20 Drawing Sheets

(56) References Cited

U.S. PATENT DOCUMENTS

| | | |
|---|---|---|
| 2013/0100737 A1 | 4/2013 | Kwak |
| 2013/0173875 A1* | 7/2013 | Kim ................... G06F 12/0246 711/160 |
| 2013/0223147 A1 | 8/2013 | Kwak |
| 2013/0229872 A1 | 9/2013 | Kim |
| 2013/0254459 A1* | 9/2013 | Laplace .............. G06F 9/45533 711/103 |
| 2014/0056073 A1 | 2/2014 | Um et al. |
| 2014/0063938 A1 | 3/2014 | Oh et al. |
| 2014/0133232 A1 | 5/2014 | Avila et al. |
| 2014/0136765 A1 | 5/2014 | Oh et al. |
| 2015/0026391 A1* | 1/2015 | Su ....................... G06F 12/0246 711/103 |

\* cited by examiner

FIG. 5A
FIG. 5B
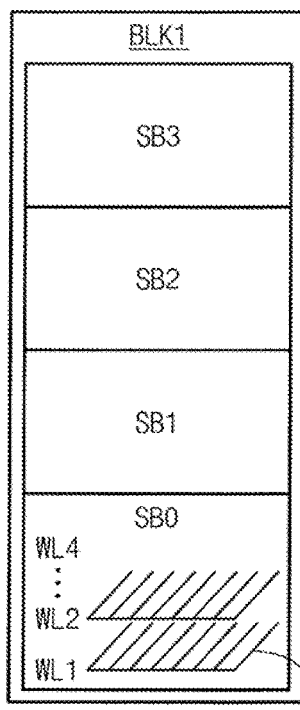
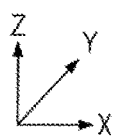

STORAGE DEVICE INCLUDING NONVOLATILE MEMORY DEVICE AND GARBAGE COLLECTION METHOD THEREOF

CROSS-REFERENCE TO RELATED APPLICATIONS

This application claims priority under 35 U.S.C. § 119 of Korean Patent Application No. 10-2015-0032481, filed on Mar. 9, 2015, the disclosure of which is incorporated by reference herein in its entirety.

TECHNICAL FIELD

The inventive concept relates to a storage device including a nonvolatile memory device and a garbage collection method thereof.

DISCUSSION OF THE RELATED ART

Nonvolatile memory devices include memory cells three-dimensionally stacked. As a capacity of the nonvolatile memory devices increases, mismatches between existing memory management policies and the nonvolatile memory devices are occurring. One of memory management policies includes a garbage collection operation.

SUMMARY

According to an exemplary embodiment of the present inventive concept, a storage device is provided as follows. A nonvolatile memory device includes blocks, each block having sub-blocks erased independently. A memory controller performs a garbage collection operation on the nonvolatile memory device by selecting a garbage collection victim sub-block among the sub-blocks and erasing the selected garbage collection victim sub-block to generate a free sub-block. The memory controller selects the garbage collection victim sub-block using valid page information of each sub-block and valid page information of memory cells adjacent to each sub-block.

According to an exemplary embodiment of the present inventive concept, a garbage collection method of a nonvolatile memory device is provided as follows. The nonvolatile memory device includes blocks, each block including sub-blocks. A first number of valid pages of each sub-block in each block is counted. A second number of valid pages of word lines adjacent to each sub-block is counted. A valid page number of each sub-block is calculated by adding the first number of each sub-block to the second number of word lines adjacent to each sub-block. A sub-block having a minimum valid page number is selected as a garbage collection victim sub-block. The garbage collection victim sub-block is erased.

According to an exemplary embodiment of the present inventive concept, a method of garbage collection method of a nonvolatile memory device is provided as follows. The nonvolatile memory device includes sub-blocks. A first number of valid pages of each sub-block is counted. At least one first sub-blocks is selected from the sub-blocks. A number of valid pages of each first sub-block is smaller than a set value. A second number of valid pages of memory cells adjacent to each of the at least one first sub-blocks is counted. A valid page number of each of the at least one first sub-blocks is calculated by adding the first number of each of the at least one first sub-blocks and the second number of the memory cells adjacent to each of the at least one first sub-blocks. A first sub-block having a minimum valid page number is selected as a garbage collection victim sub-block. The garbage collection victim sub-block is erased.

BRIEF DESCRIPTION OF THE DRAWINGS

These and other features of the inventive concept will become more apparent by describing in detail exemplary embodiments thereof with reference to the accompanying drawings of which:

FIGS. 5A and 5B are drawings illustrating memory blocks, sub-blocks and the number of valid pages of FIG. 1;

DETAILED DESCRIPTION OF EXEMPLARY EMBODIMENTS

Figure 1:
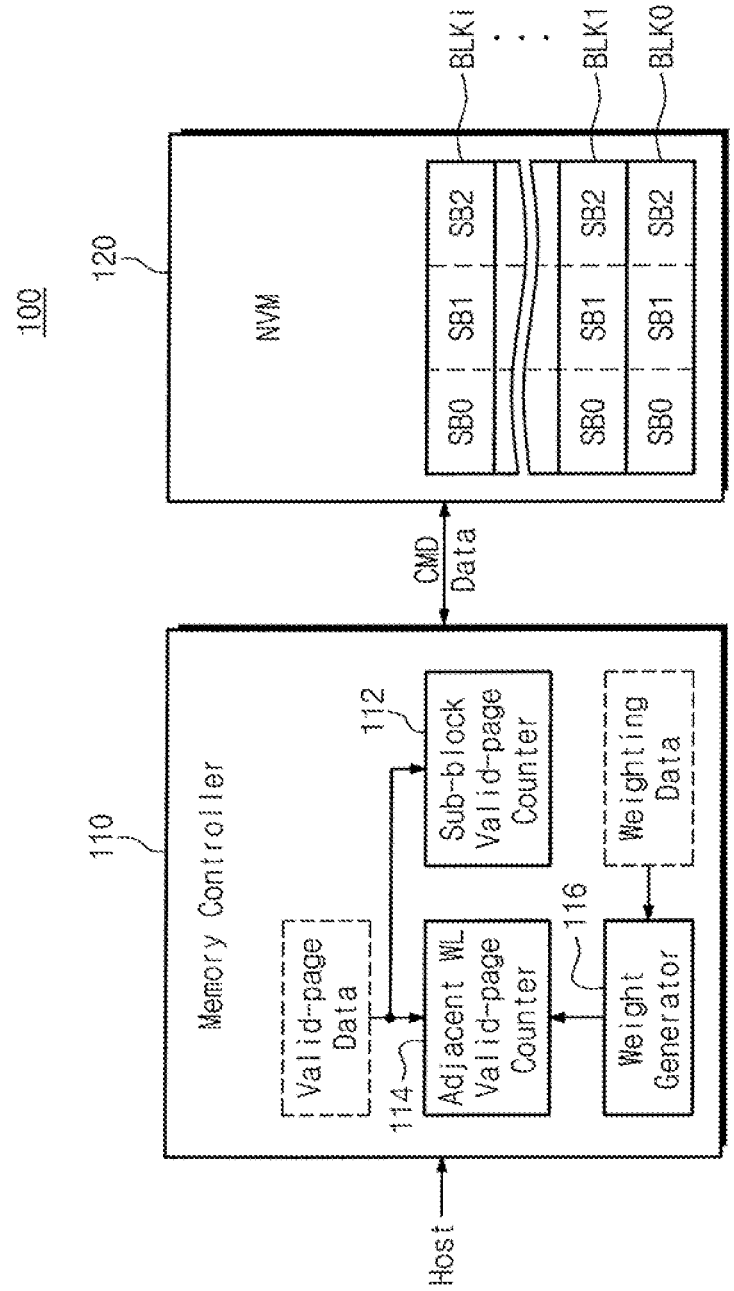
FIG. 1 is a block diagram illustrating a storage device in accordance with an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

A flash memory device may be used as a nonvolatile storage medium for explaining a characteristic and a function of the inventive concept. However, those skilled in the art will readily appreciate other advantages and performance of the inventive concept by described contents. Also, a storage medium may be constituted by other nonvolatile memory devices. For example, a phase change random access memory (PRAM), a magnetoresistive RAM (MRAM), a resistive RAM (ReRAM), a ferroelectric RAM (FRAM), NOR flash memory, etc. may be used as a storage medium and they may also be applied to a storage device in which different kinds of memory devices are mixed.

FIG. 1 is a block diagram illustrating a storage device in accordance with exemplary embodiments of the inventive concept. Referring to FIG. 1, a storage device 100 may include a memory controller 110 and a nonvolatile memory device 120. The memory controller 110 may include a sub-block valid-page counter 112, an adjacent word line valid-page counter 114 and a weight generator 116.

The sub-block valid-page counter 112 may count a valid page included in a corresponding sub-block by a sub-block unit with reference to valid page information. The adjacent word line valid-page counter 114 may count a valid page of a word line in which word line interference occurs due to an erase operation among word lines of sub-blocks adjacent to each sub-block. The weight generator 116 may generate different weights at every memory cell using weight information. Operations of the sub-block valid-page counter 112, the adjacent word line valid-page counter 114, and the weight generator 116 will be described in further detail below.

The memory controller 110 is configured to control the nonvolatile memory device 120 in response to a request of a host. The memory controller 110 interfaces with the host and the nonvolatile memory device 120. The memory controller 110 controls the nonvolatile memory device 120 to write information in response to a write request of the host. The memory controller 110 controls a read operation of the nonvolatile memory device 120 in response to a read command from the host. The memory controller 110 may perform a garbage collection operation with respect to the nonvolatile memory device 120.

In the memory controller 110, a FTL (flash translation layer) which is a firmware to provide an interface for hiding a delete operation of the nonvolatile memory device 120 between a file system of the host and the nonvolatile memory device 120. Using the FTL, the memory controller 110 may perform an erase-before-write and handle mismatches in addresses between an erase unit and a write unit.

For example, in a write operation of the nonvolatile memory device 120, the FTL maps a logical address generated by the file system to a physical address of the nonvolatile memory device 120.

The memory controller 110 may control the nonvolatile memory device 120 to perform an erase operation of a sub-block unit or an erase operation of a block unit. In a garbage collection operation, the memory controller 110 may select a garbage collection victim sub-block on the basis of the number of valid pages of a sub-block and the number of valid pages of a word line adjacent to the sub-block. For example, after the number of valid pages of a sub-block and the number of valid pages of a word line adjacent to the sub-block are counted, the memory controller 110 may select a sub-block having minimum sum of the counted number of valid pages as a victim sub-block. The adjacent word line means a word line in which interference occurs in an erase operation of a sub-block unit. For example, memory cells associated with the adjacent word line may lose data due the interference. The memory controller 110 may erase the selected victim sub-block to generate a free-sub-block.

The memory controller 110 may additionally consider condition information of an adjacent word line together with the number of valid pages of the adjacent word line when selecting a garbage collection victim sub-block. The condition information of the word line may include program-erase cycle information and degradation information of memory cells connected to a corresponding word line. The memory controller 110 may count a valid page of an adjacent word line by applying a weight generated with reference to that condition information.

The memory block means a concurrent erasable physical block unit. In a three-dimensional nonvolatile memory device in which a word line is stacked in a direction perpendicular to a substrate, a memory block may be defined as a group of cell strings sharing all the stacked word lines. The sub-block corresponds to a memory unit obtained by dividing a memory block (or physical block) by a word line unit or a select line unit.

The nonvolatile memory device 120 performs erase, read and write operations under the control of the memory controller 110. The nonvolatile memory device 120 includes a plurality of memory blocks and each memory block includes a plurality of memory cells arranged in rows and columns. Each memory cell stores multi-level (or multi-bit) information.

The nonvolatile memory device 120 includes a plurality of memory blocks BLK0~BLKi. Each of the memory blocks BLK0~BLKi constitutes one erase unit. Each of the memory blocks BLK0~BLKi may be stacked in a direction crossing a substrate to include a plurality of memory cells constituting a NAND type cell string.

Each of the memory blocks BLK0~BLKi is divided into a plurality of sub-blocks. For example, the memory block BLK0 may be divided into a plurality of sub-blocks. For the convenience of description, it is assumed that a memory block is divided into three sub-blocks. The present inventive concept is not limited thereto. For example, a memory block may be divided into two or more than three sub-blocks.

The storage device in accordance with exemplary embodiments of the inventive concept, in an erase operation of a sub-block unit, selects a garbage collection victim sub-block considering valid page information of adjacent memory cells in which an interference phenomenon occurs. For example, when selecting a garbage collection victim sub-block, the storage device considers the number of valid pages of an adjacent word line together with the number of valid pages of a sub-block. According to exemplary embodiments of the inventive concept, when selecting a garbage collection victim sub-block, the storage device additionally considers condition information of a word line adjacent to a sub-block. A garbage collection time may be reduced by selecting a sub-block considering the number of valid pages of adjacent word line and/or condition information of adjacent word line. An error caused by an interference phenomenon that occurs in an adjacent word line due to an erase operation of a sub-block unit may be reduced.

Figure 2:
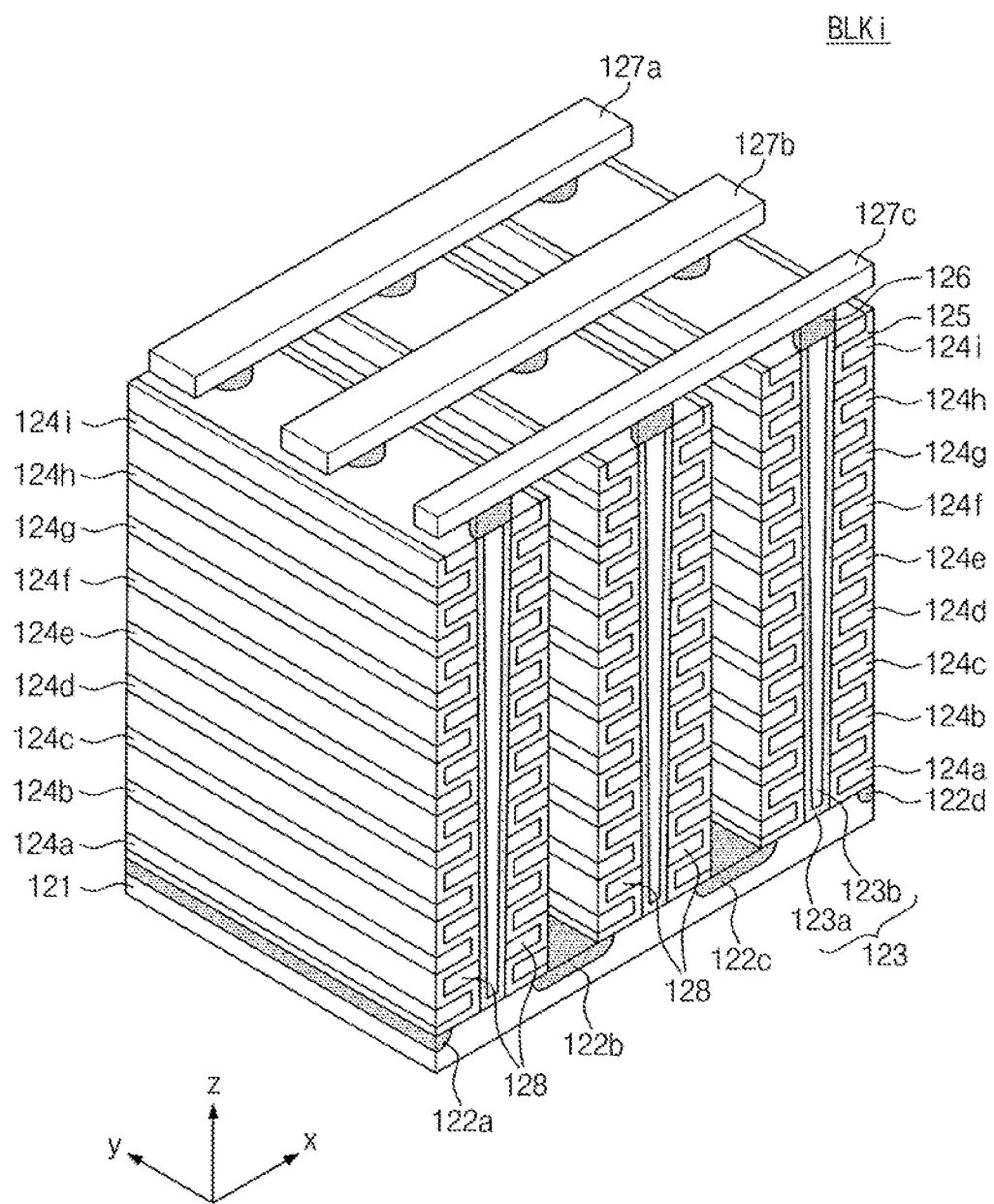
FIG. 2 is a perspective view illustrating a structure of a memory block of a nonvolatile memory device of FIG. 1.

FIG. 2 is a perspective view illustrating a structure of a memory block of a nonvolatile memory device of FIG. 1. Referring to FIG. 2, a memory block BLKi includes a structure extending along a plurality of directions (x, y, z).

To form the memory block BLKi, a substrate 121 may have a P-well by injecting a V group element such as boron B into the substrate 121. The substrate 121 may also have a pocket P-well being provided inside an N-well. It is assumed that the substrate 121 is a P-well. However, the substrate 121 is not limited to the P-well.

On the substrate 121, a plurality of doping regions 122a, 122b, 122c and 122d is formed along a x direction. For example, the doping regions 122a, 122b, 122c and 122d may be formed as a conductor of n-type different from the substrate 121. It is assumed that the doping regions 122a, 122b, 122c and 122d have an n-type. However, the first through fourth doping regions 122a, 122b, 122c and 122d are not limited to have an n-type.

On a region of the substrate 121 between the first and second regions 122a and 122b, a plurality of insulating materials 128 extending in the y direction is sequentially provided along the z direction. For example, the insulating materials 128 are formed to be spaced in a specific distance apart from one another along the z direction. The insulating materials 128 include an insulating material such as silicon oxide.

Pillars 123 which are sequentially disposed along the y direction and penetrate the insulating materials 128 along the z direction are formed on a top surface of the substrate 121 between the first and second regions 122a and 122b. The pillar 123 penetrates the insulating materials 128 to be connected to the substrate 121. The pillar 123 is formed on a top surface of the substrate 121 between the second and third doping regions 122b and 122c and on a top surface of the substrate 121 between the third and fourth doping regions 122c and 122d.

The pillar 123 may include a plurality of materials. For example, a surface layer 123a of the pillar 123 may include a silicon material having a first-conductivity type impurity. The surface layer 123a of the pillar 123 may include a silicon material having the same conductivity-type as the substrate 121. For example, the surface layer 123a of the pillar 123 may include p-type silicon. However, the surface layer 123a of the pillar 123 is not limited to include p-type silicon. An inner layer 123b of the pillar 123 may include an insulating material. For example, the inner layer 123b of the pillar 123 includes an insulating material such as silicon oxide.

On a region between the first and second doping regions 122a and 122b, an insulating layer 125 is provided along exposed surfaces of the insulating materials 128, the pillars 123 and the substrate 121. An insulating layer 125 being provided on a top surface of the uppermost insulating material 128 being provided along the z direction may be removed.

On a region between the first and second doping regions 122a and 122b, first conductive materials 124a-124i are provided on an exposed surface of the insulating layer 125. For example, a first conductive material 124a extending in the y direction is provided between the substrate 121 and the insulating material 128 adjacent to the substrate 121. For example, the first conductive material 124a extending in the y direction is provided between the substrate 121 and the insulating layer 125 of a bottom surface of the insulating material 128 adjacent to the substrate 121.

On a region between the second and third doping regions 122b and 122c, a structure which is the same with the structure on a region between the first and second doping regions 122a and 122b is provided. On a region between the third and fourth doping regions 122c and 122d, a structure which is the same with the structure on a region between the first and second doping regions 122a and 122b is provided.

Drains 126 are provided on the pillars 123 respectively. The drains 126 may be silicon material doped with a second conductivity-type impurity. For example, the drains 126 may be silicon material doped with n-type impurities. It is assumed that the drains 126 include n-type silicon. However, the drains 126 are not limited to include n-type silicon.

Second conductive materials 127a-127c extending in the x direction are provided on the drains 126. The second conductive materials 127a-127c are sequentially disposed along the y direction. Each of the second conductive materials 127a-127c is connected to corresponding drains 126. The second conductive materials 127a-127c extending in the x direction are connected to the drains 126 through contact plugs.

The first conductive materials 124a-124i form word lines WLs and select lines SSL and GSL respectively. In the first conductive materials 124b-124h forming word lines among the first conductive materials 124a-124i, conductive materials which belong to the same layer are connected to one another. The memory block BLKi may be selected when all the first conductive materials 124a-124i are selected. The sub-block of the inventive concept may be selected even when parts of the first conductive materials 124a-124i are selected.

The number of layers of the first conductive materials 124a-124i is illustrative. The number of layers of the first conductive materials 124a-124i may be changed depending on a process technology or a control technology.

Figure 3:
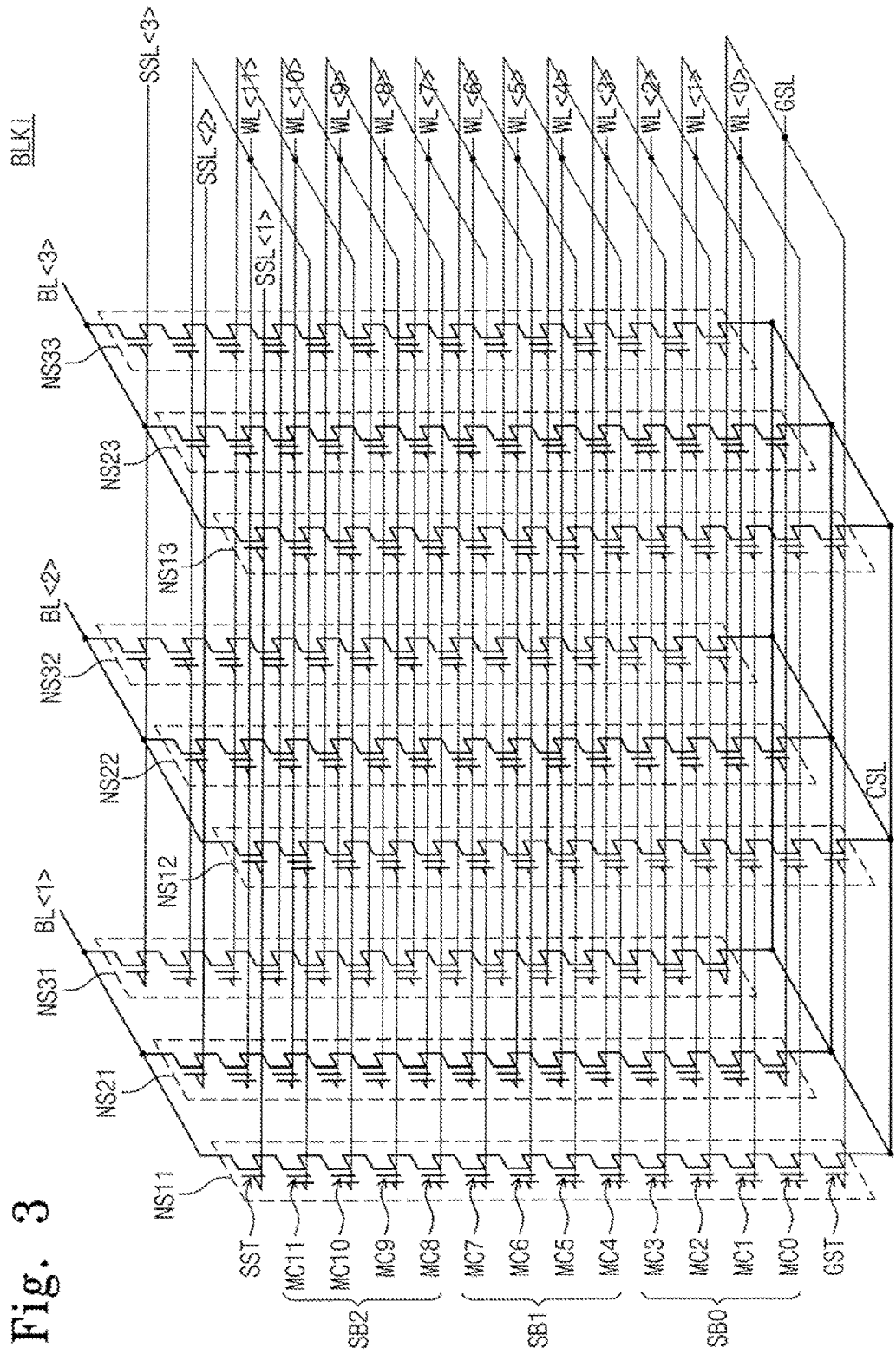
FIG. 3 is an equivalent circuit illustrating a structure of the memory block BLKi of FIG. 2.

FIG. 3 is an equivalent circuit illustrating a structure of the memory block BLKi of FIG. 2. Referring to FIGS. 2 and 3, cell strings NS11-NS33 are formed between bit lines BL<1>, BL<2> and BL<3> and a common source line CSL.

The cell strings NS11, NS21 and NS31 are formed between the first bit line BL<1> and the common source line CSL. The cell strings NS12, NS22 and NS32 are formed between the second bit line BL<2> and the common source line CSL. The cell strings NS13, NS23 and NS33 are formed between the third bit line BL<3> and the common source line CSL. The first through third bit lines BL<1>, BL<2> and BL<3> correspond to second conductive materials 127a~127c extending in the x direction, respectively.

String select transistors SST of the cell strings NSs are connected to a corresponding bit line BL. Ground select transistors GST of the cell strings NSs are connected to the common source line CSL. Memory cells MC0~MC11 are provided between the string select transistor SST and the ground select transistor GST.

The cell strings NSs are divided by a row unit and a column unit. Cell strings NS connected to a bit line in common form a column. For example, the cell strings NS11, NS21 and NS31 connected to the first bit line BL<1> correspond to a first column. The cell strings NS12, NS22 and NS32 connected to the second bit line BL<2> correspond to a second column. The cell strings NS13, NS23 and NS33 connected to the third bit line BL<3> correspond to a third column.

Cell strings NS connected to a string select line SSL form a row. For example, the cell strings NS11, NS12 and NS13 connected to a first string select line SSL<1> form a first row. The cell strings NS21, NS22 and NS23 connected to a second string select line SSL<2> form a second row. The cell strings NS31, NS32 and NS33 connected to a third string select line SSL<3> form a third row.

Each of the cell strings NS includes the ground select transistor GST. The ground select transistors GST may be controlled by a ground select line GSL. Although not illustrated in the drawing, cell strings corresponding to the rows may be controlled by other ground select lines respectively.

Memory cells MC corresponding to the same semiconductor layer share a word line WL. Memory cells MC0 of the cell strings NS11-NS33 are connected to a word line WL<0>. Cell strings NS of the same row share the string select line SSL. Cell strings NS of different rows are connected to different string select lines SSL<1>, SSL<2> and SSL<3>, respectively. The cell strings NS are connected to the common source line CSL in common. For example, the first through fourth doping regions 122a, 112b, 112c and 122d are connected to one another to form the common source line CSL.

The memory block BLKi described above may be divided into a plurality of sub-blocks SB0, SB1 and SB2 which is smaller than the memory block BLKi. The sub-blocks SB0, SB1 and SB2 may be classified along a word line direction. Even if the sub-blocks are divided based on any criterion, each sub-block has to be erased in the memory block BLKi independently of other sub-blocks. In an exemplary embodiment, the memory block BLKi may be erased at a time or each of the sub-blocks in the memory block BLKi may be independently erased.

The sub-block SB0 may include memory cells connected to word lines WL<0>, WL<1>, WL<2> and WL<3> among the memory cells included in the memory block BKLi. The sub-block SB1 may include memory cells connected to word lines WL<4>, WL<5>, WL<6> and WL<7> among the memory cells included in the memory block BKLi. The sub-block SB2 may include memory cells connected to word lines WL<8>, WL<9>, WL<10> and WL<11> among the memory cells included in the memory block BKLi. Memory cells included in the sub-block SB0 may be erased independently of the remaining sub-blocks SB1 and SB2. For example, at least one of the sub-blocks SB0, SB1 and SB2 may be selected at the same to be erased. In an exemplary embodiment, A bias condition to erase memory cells in a sub-block SB unit may be applied.

A division method of a sub-block defined inside the memory block BLKi was described as an illustration. However, a criteria of division of the sub-block is not limited to the examples illustrated above. For example, an example that the memory block BLKi is divided into three sub-blocks was described but it may be divided into two or more than three sub-blocks. A sub-block SB may include two or three word lines and may also include more than five word lines.

Figure 4:
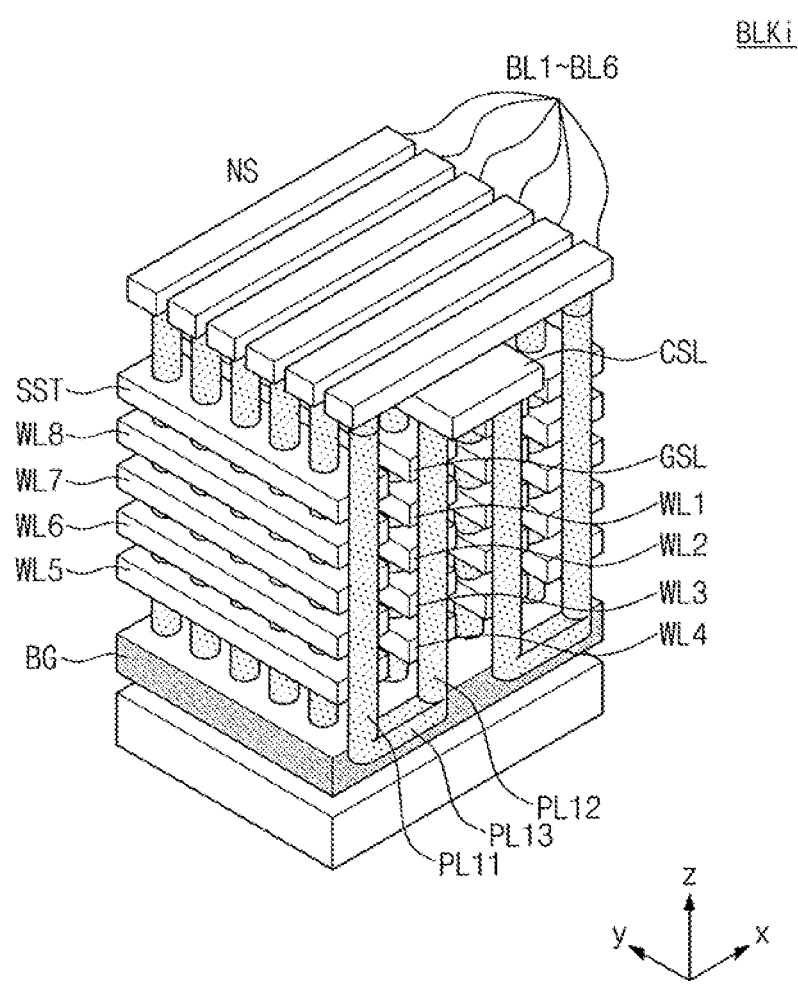
FIG. 4 is a perspective view illustrating a structure of a memory block of a nonvolatile memory device of FIG. 1.

FIG. 4 is a perspective view illustrating a structure of a memory block of a nonvolatile memory device of FIG. 1. For the convenience of description, it is assumed that the number of layers of word line of the memory block BLKi is four. The memory block BLKi may be embodied in a PBiCS (pipe-shaped bit cost scalable) structure in which lower portions of adjacent memory cells serially connected are connected to one another through pipes. The memory block BLKi includes strings of m×n (m, n is a natural number).

In FIG. 4, a case that m is 6 and n is 2 is illustrated as an illustration. Each string NS may include memory cells MC1-MC8 serially connected to one another. A first top of the memory cells MC1-MC8 is connected to a string select transistor SST, a second top of the memory cells MC1-MC8 is connected to a ground select transistor GST and a bottom of the memory cells MC1~MC8 may be connected through the pipe.

Memory cells constituting a string NS are stacked on a plurality of semiconductor layers to be formed. Each string NS includes a first pillar PL11, a second pillar PL12 and a pillar connection part PL13 connecting the first and second pillars PL11 and PL12. The first pillar PL11 is connected to a bit line (for example, BL1) and the pillar connection part PL13 and penetrates the string select line SSL and the word lines WL5~WL8. The second pillar PL12 is connected to the common source line CSL and the pillar connection part PL13 and penetrates the ground select line GSL and the word lines WL1~WL4. As illustrated in FIG. 4, the string NS is embodied in a U character pillar shape.

For example, a back-gate BG may be formed on a substrate and the pillar connection part PL13 may be embodied inside the back-gate BG. The back-gate BG may exist in the memory block BLKi in common. The back-gate BG may be separated from a back-gate of other memory block.

FIGS. 5A and 5B are drawings illustrating memory blocks, sub-blocks and the number of valid pages of FIG. 1. Referring to FIG. 5B, memory blocks BLK1 and BLK2 include a plurality of sub-blocks SB0, SB1, SB2 and SB3. Each sub-block includes four word line layers and each word line layer includes eight sub word lines.

FIG. 5A illustrates a constitution of the memory block BLK1. FIG. 5B represents the number of valid pages of the sub-blocks SB0, SB1, SB2 and SB3 of the memory blocks BLK1 and BLK2. FIG. 5B is a cross section of the FIG. 5A taken along a X-Z plane, for example, a bit line direction. Numbers of FIG. 5B means the number of valid pages of each memory cell in the sub-block. For the convenience of description, it is assumed that a nonvolatile memory device in accordance with exemplary embodiments of the inventive concept is a TLC (triple level cell) method. However, the nonvolatile memory device in accordance with exemplary embodiments of the inventive concept is not limited to the TLC method and may be a SLC (single level cell) method or a MLC (multi level cell) method. The nonvolatile memory device of TLC method may store 3-bit information of three logical pages.

In FIG. 5B, a location of each number corresponds to a location of a memory cell. Each number may also mean the number of valid pages of a memory cell. For example, the number 2 means that the number of valid pages of a memory cell is two. In the case of a memory device of TLC method, a total of three logical pages exist per one memory cell. Thus, the number 2 represents that two of three logical pages are valid pages and the remaining page is an invalid page.

Figure 6:
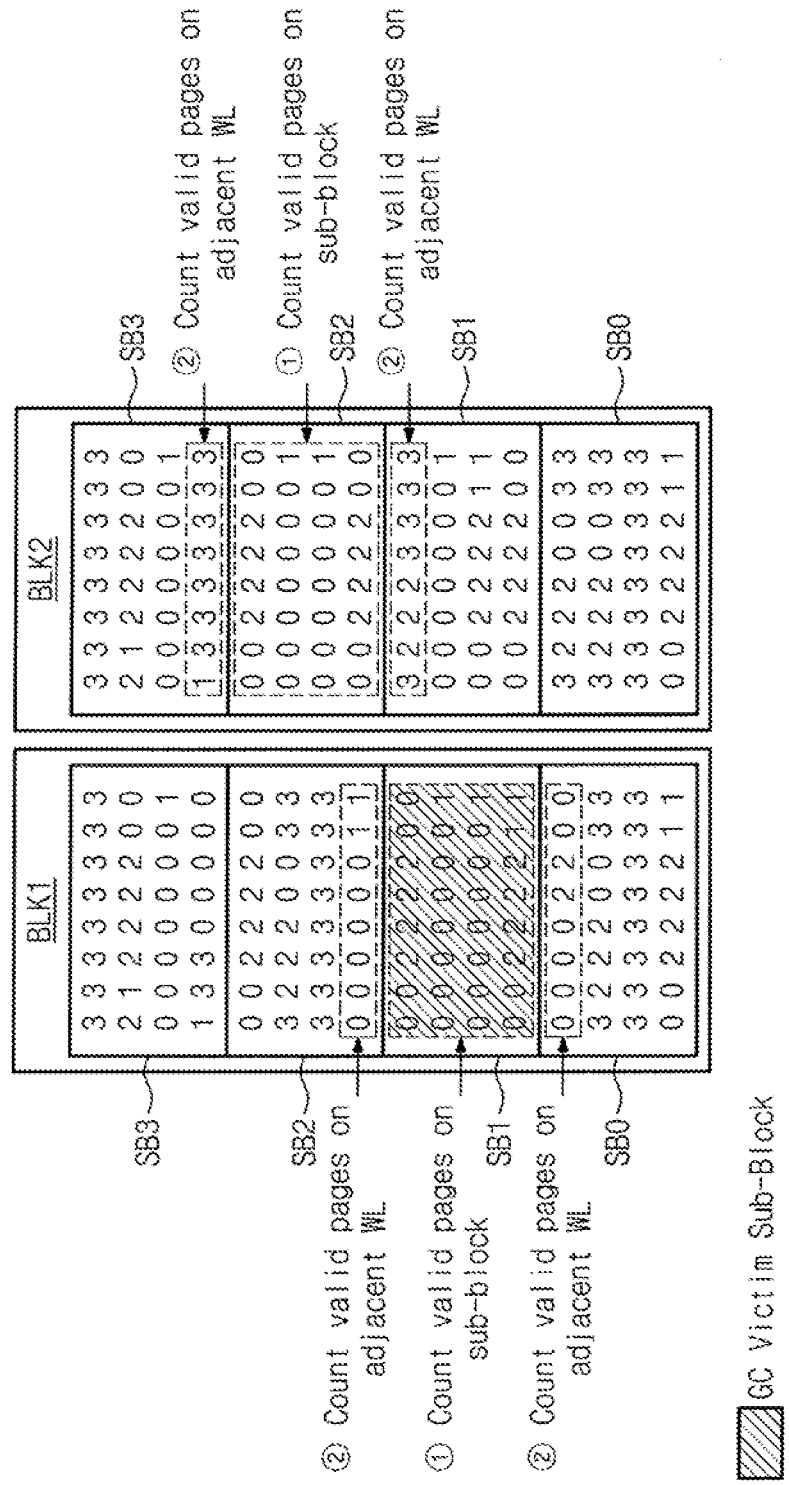
FIG. 6 is a drawing for explaining an operation of a storage device in accordance with an exemplary embodiment of the inventive concept.

FIG. 6 is a drawing for explaining an operation of a storage device in accordance with exemplary embodiments of the inventive concept. A garbage collection operation of a storage device in accordance with exemplary embodiments of the inventive concept is described with reference to FIGS. 1 and 6.

The memory controller 110 of FIG. 1 includes the sub-block valid-page counter 112 and the adjacent word line valid-page counter 114. The memory controller 110 includes valid page information which is information about a valid page of each memory cell. The valid page information may be loaded and renewed in a high speed static random access memory (SRAM). The valid page information may be stored in a specific area of the nonvolatile memory device 120 periodically or when necessary. In a power-off, the memory controller 110 may write the valid page information in a specific area of the nonvolatile memory device 120. In a power-on, the memory controller 110 may read valid page information stored in a specific area of the nonvolatile memory device 120.

The sub-block valid-page counter 112 counts valid pages included in a corresponding sub-block by a sub-block unit with reference to the valid page information. The sub-block valid-page counter 112 counts valid pages of the sub-blocks SB0, SB1, SB2 and SB3 illustrated in FIG. 5. For example, the sub-block valid-page counter 112 may count valid pages of the sub-block SB1 of the memory block BLK1 (①). Referring to FIG. 5, in the case that the sub-block valid-page counter 112 counts valid pages of the sub-block SB2 of the memory block BLK1, the count result may be 20. The sub-block valid-page counter 112 may count valid pages of the sub-block SB2 of the memory block BLK2 (①). Referring to FIG. 6, in the case that the sub-block valid-page counter 112 counts valid pages of the sub-block SB2 of the memory block BLK2, a count result may be 18. The sub-block valid-page counter 112 of the memory controller 110 counts the number of valid pages with respect to sub-blocks of all the memory blocks.

The sub-block valid-page counter 112 may count valid pages of each sub-block by applying weight. The weight may be generated from the weight generator 116. For example, the weight may be generated according to the number of times of erase of each sub-block. In this case, as the number of times of erase becomes more, the weight has a greater value. The weight may be generated only with respect to sub-blocks having number of times of erase greater than a predetermined number of times. For instance, a weight with respect to sub-blocks having number of times of erase smaller than the predetermined number of times may be 1. A weight greater than 1 may be applied to sub-blocks having number of times of erase greater than the predetermined number of times.

The adjacent word line valid-page counter 114 counts valid pages of a word line in which a word line interference occurs due to an erase operation among word lines of sub-blocks adjacent to each sub-block. In the case that an interference phenomenon occurs in one of word lines of an adjacent sub-block due to an erase operation of a sub-block unit, the adjacent word line valid-page counter 114 counts the number of valid pages with respect to the word line in which an interference phenomenon occurs. For example, the adjacent word line valid-page counter 114 counts valid pages of a word line nearest to the second sub-block SB1 among word lines of the sub-blocks SB0 and SB2 adjacent to the second sub block SB1 of the first memory block BLK1 (②).

The memory controller 110 adds the number of valid pages counted by the sub-block valid-page counter 112 to the number of valid pages counted by the adjacent word line valid-page counter 114. For example, the memory controller 110 adds 20 which is the number of valid pages of the sub-block to 6 which is the number of valid pages of adjacent word lines with respect to the sub-block SB1 of the memory block BLK1. Similarly, the memory controller 110 adds 18 which is the number of valid pages of the sub-block to 43 which is the number of valid pages of adjacent word lines with respect to the sub-block SB2 of the memory block BLK2. In the same manner, the memory controller 1100 performs the adding operation of valid pages described above with respect to sub-blocks of the all the memory blocks.

After that, the memory controller 110 may select a sub-block having the minimum addition result as a garbage collection victim sub-block. The memory controller 110 may erase the selected victim garbage collection sub-block to generate a free sub-block.

The memory controller 110 may further include the weight generator 116. The weight generator 116 may generate weight with reference to weight information. The weight information may include condition information of memory cells. The condition information may include PE (Program-Erase) cycle information and degradation information of each memory cell. The condition information may also include information with respect to a word line interference compensation scheme applied to a corresponding nonvolatile memory device.

In the case of erasing information of a specific sub-block in a nonvolatile memory device performing an erase operation by a sub-block unit, a word line interference phenomenon due to an erase operation occurs in a word line adjacent to a corresponding sub-block. The interference phenomenon may cause a charge spreading phenomenon in a memory cell connected to a word line of an unselect sub-block adjacent to a sub-block selected for an erase operation. Charges captured by a memory cell may move to a substrate by the charge spreading phenomenon and this means that information stored in a memory cell may be inadvertently erased. A soft erase may occur in a memory cell by the charge spreading phenomenon. Thus, reliability of information stored in a memory cell may decrease in the erase operation.

To guarantee reliability of information according to the word line interference phenomenon, the nonvolatile memory device may apply a word line interference compensation scheme. The word line interference compensation scheme may be a copy back scheme that before an erase operation, valid information of an adjacent word line in which a word line interference phenomenon may occur is copied to other word line and after the erase operation, the valid information is written back in the adjacent word line. The word line interference compensation scheme may be a post-recharge scheme that valid information of adjacent word line is copied to memories dynamic random access memory (DRAM), SRAM, resistive random access memory (ReRAM), etc. having a high speed and then, after the erase operation, memory cells of the adjacent word line are recharged with reference to copied information. Alternatively, the word line interference compensation scheme may be a pre-overcharge scheme of compensating in advance for an effect by an interference that may occur in an adjacent word line due to an erase operation of a sub-block. In the pre-overcharge scheme, a copy back operation may be omitted.

The weight generator 116 may generate different weights for each memory cell using the condition information described above. In an exemplary embodiment, the weight generator 116 may generate the same weight by each word line unit using the condition information. For example, in the case that PE cycle information of a specific memory cell is greater than a predetermined number, although a valid page of a memory cell is 1, a weight greater than 1 may be generated considering a lifespan of a corresponding memory cell. In this case, the adjacent word line valid-page counter 114 may count the number of valid pages of a corresponding memory cell as a value greater than 1. In the case that PE cycle information of a specific memory cell is less than the predetermined number, the weight generator 116 may generate a weight smaller than 1. In this case, a value of a valid page of a corresponding memory cell counted by the adjacent word line valid-page counter 114 may be smaller than the number of actual valid pages. In an exemplary embodiment, the predetermined number may be set to a value considering memory cell characteristics. For example, the predetermined number may be set through a test operation.

The weight generator 116 may generate different weights according to the word line interference compensation scheme applied to the storage device 100. For example, in the case that a word line interference compensation scheme that does not need a copy back operation is applied, the weight generator 116 may generate smaller weight compared with a case that a scheme based on a copy back is applied. For example, as the word line interference compensation scheme is simple, efficient and rapid, smaller weight may be generated.

The weight generator 116 may generate different weights depending on a distance apart from the sub-blocks. As a distance from the corresponding sub-block increases, the weight generator 116 may generate smaller weight based on a weight with respect to memory cells nearest to the sub-block. For example, since as a distance from the corresponding sub-block decreases, an effect of interference due to an erase operation is great, the weight generator 116 may generate a weight considering that.

The adjacent word line valid-page counter 114 counts the number of valid pages of adjacent word line by applying the weight. The adjacent word line valid-page counter 114 counts the number of valid pages of an adjacent word line with respect to all the sub-blocks.

The memory controller 110 may calculate a sum of a count value of the sub-block valid-page counter 112 and a count value of the adjacent word line valid-page counter 114 with respect to each sub-block. The memory controller 110 selects the sub-block having the minimum addition result as a garbage collection victim sub-block. The memory controller 110 erases the selected victim garbage collection sub-block to generate a free sub-block.

The storage device 100 selects a garbage collection victim sub-block considering the number of valid pages of the sub-block together with the number of valid pages of adjacent word line in a garbage collection operation. By considering the number of valid pages of adjacent word line, an operation of a word line interference compensation scheme due to an erase operation of the sub-block becomes more effective. For example, in FIG. 5, in the case of selecting a garbage collection victim sub-block only on the basis of the number of valid pages of the sub-block, the sub-block SB2 of the memory block BLK2 may be selected as the garbage collection victim sub-block. However, in this case, according to an application of the word line interference compensation scheme, valid information that has to be copied increases compared with a case of selecting the sub-block SB1 of the block BLK1. Thus, in the case of selecting the sub-block SB2 of the block BLK1 as a victim sub-block, write time of the word line interference compensation scheme increases, thereby increasing a garbage collection operation time.

The storage device 100 selects a garbage collection victim sub-block considering the number of valid information that has to be copied according to a word line interference compensation scheme. For example, a garbage collection time may be reduced by selecting a block having small valid information that has to be copied due to the word line interference compensation scheme. Because of reduction of garbage collection time, performance of the storage device 100 is increased. The quantity of valid information that has to be copied may be reduced according to the word line interference compensation scheme. Accordingly, a WAF (write amplification factor) and/or a lifespan of the memory device may increase.

Figure 7:
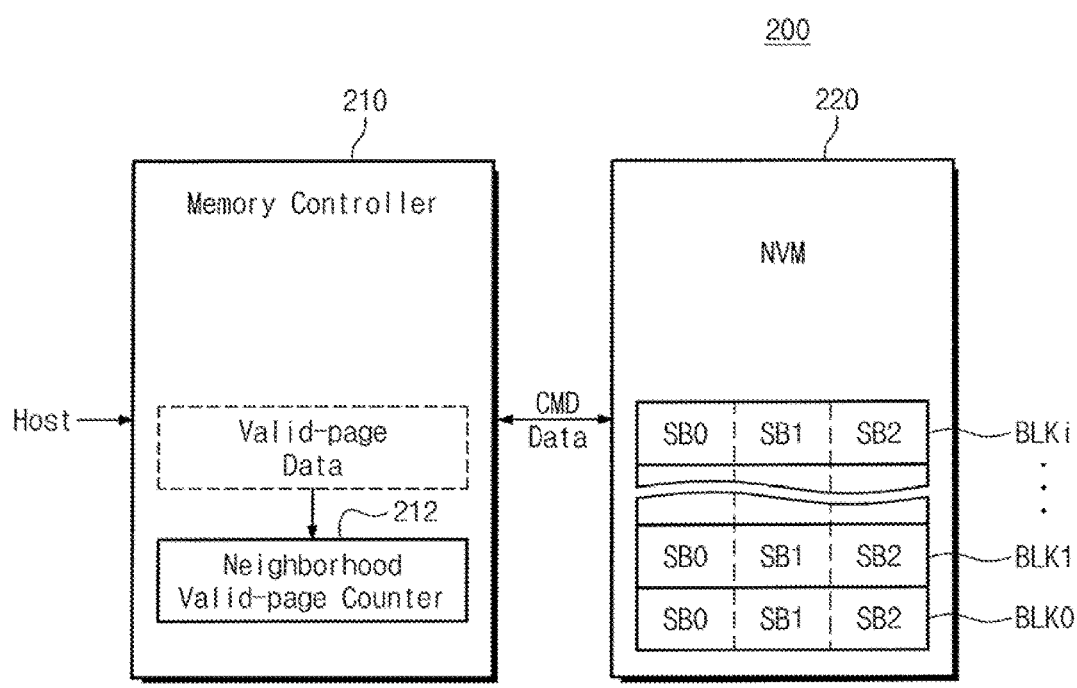
FIG. 7 is a block diagram illustrating a storage device in accordance with an exemplary embodiment of the inventive concept.

FIG. 7 is a block diagram illustrating a storage device in accordance with an exemplary embodiment of the inventive concept. Referring to FIG. 7, a storage device 200 includes a memory controller 210 and a nonvolatile memory device 220. The memory controller 210 may include a neighborhood valid-page counter 212. The neighborhood valid-page counter 212 may count the number of valid pages of a sub-block and the number of valid pages of memory cells adjacent to the sub-block. For example, the neighborhood valid-page counter 212 counts the number of valid pages of an area including the sub-block. Since the nonvolatile memory device 220 is the same as the nonvolatile memory device 120 of FIG. 1, a description of the nonvolatile memory device 220 will be omitted.

Figure 8:
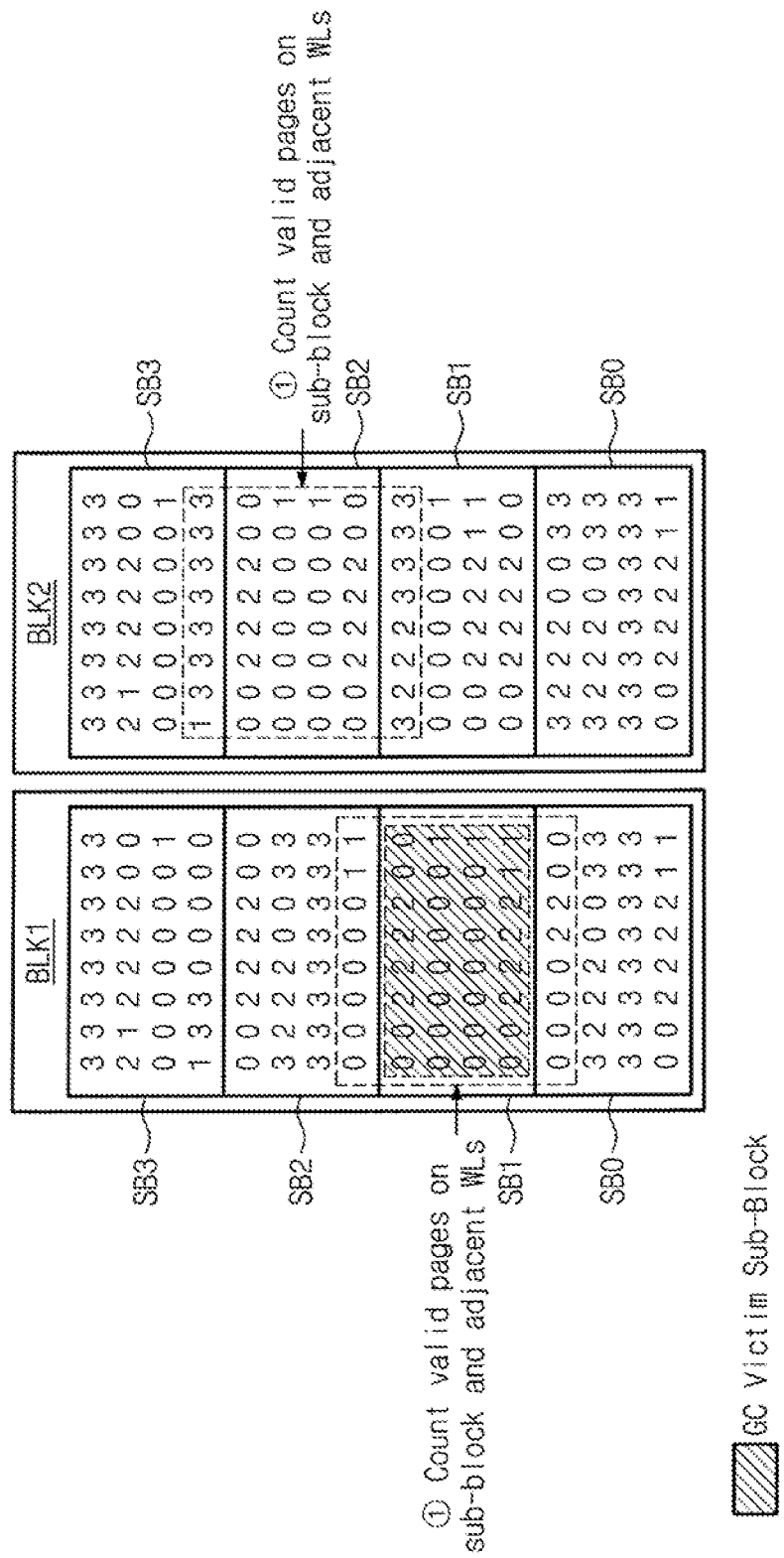
FIG. 8 is a drawing for explaining an operation of a storage device of FIG. 7.

FIG. 8 is a drawing for explaining an operation of the storage device of FIG. 7. An operation of the storage device 200 in accordance with an exemplary embodiment of the inventive concept will be described with reference to FIG. 8.

The neighborhood valid-page counter 212 counts the number of valid pages of each sub-block and the number of valid pages of a word line adjacent to a corresponding sub-block at the same time with reference to valid page information. The adjacent word line which the neighborhood valid-page counter 212 counts may be a word line in which word line interference due to an erase operation occurs. Thus, the number of the adjacent word line which the neighborhood valid-page counter 212 counts may be at least one. For example, in the case that an interference phenomenon occurs in successive two adjacent word lines, the neighborhood valid-page counter 212 counts the number of valid pages of the two adjacent word lines respectively.

The neighborhood valid-page counter 212 counts the number of valid pages of a corresponding sub-block and the number of valid pages of an adjacent word line at the same time with respect to each sub-block (①). The neighborhood valid-page counter 212, unlike the valid page counters 112 and 114 of FIG. 1, may count the number of valid pages of each sub-block and the number of valid pages of an adjacent word line without considering weight.

The memory controller 210 may compare the numbers of valid pages counted with each sub-block by the neighborhood valid-page counter 212 to select a sub-block having the minimum number of valid pages as a garbage collection victim sub-block. Referring to FIG. 8, since the number of valid pages of sub-block SB1 of a memory block BLK1 is 26 and is smallest, the sub-block SB1 may be selected as a victim sub-block.

The storage device 200 may select a garbage collection victim sub-block considering the number of valid pages of an adjacent word line in which word line interference occurs in an erase operation of a sub-block unit. Since the neighborhood valid-page counter 212 counts the number of valid pages of an adjacent word line without considering weight, a garbage collection victim sub-block may be more rapidly selected. The storage device 200 may be more efficient than a case that a word line interference compensation scheme based on a copy back is applied.

Figure 9:
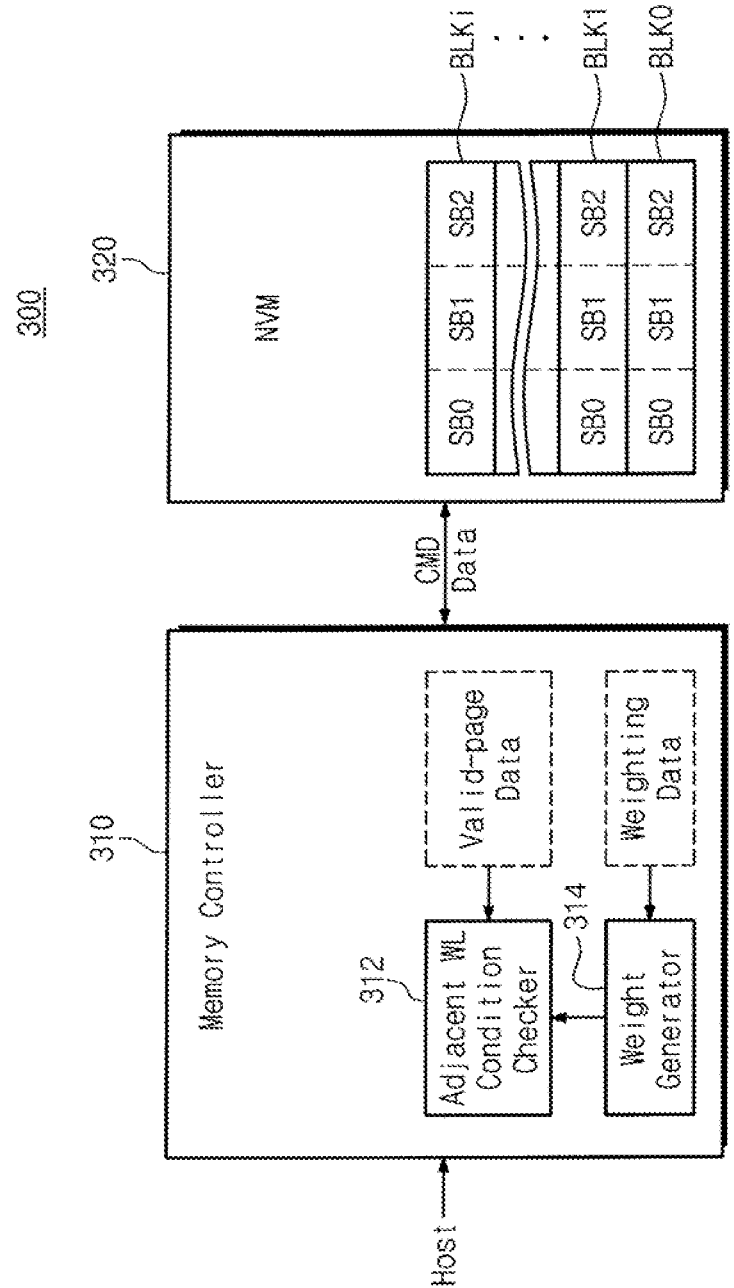
FIG. 9 is a block diagram illustrating a storage device in accordance with an exemplary embodiment of the inventive concept.

FIG. 9 is a block diagram illustrating a storage device in accordance with an exemplary embodiment of the inventive concept. Referring to FIG. 9, a storage device 300 includes a memory controller 310 and a nonvolatile memory device 320. The memory controller 310 may include an adjacent word line condition checker 312 and a weight generator 314. The adjacent word line condition checker 312 checks a condition of a memory cell of an adjacent word line in which a word line interference phenomenon occurs due to an erase operation of a sub-block unit. The weight generator 314 may generate weight with respect to each memory cell using condition information. Since the nonvolatile memory device 320 is the same as the nonvolatile memory device 120 of FIG. 1, a description of the nonvolatile memory device 320 will be omitted.

The storage device 300 checks a condition of an adjacent word line in which word line interference occurs in a sub-block erase operation and may select a garbage collection victim sub-block using the condition of the adjacent word line.

Figure 10:
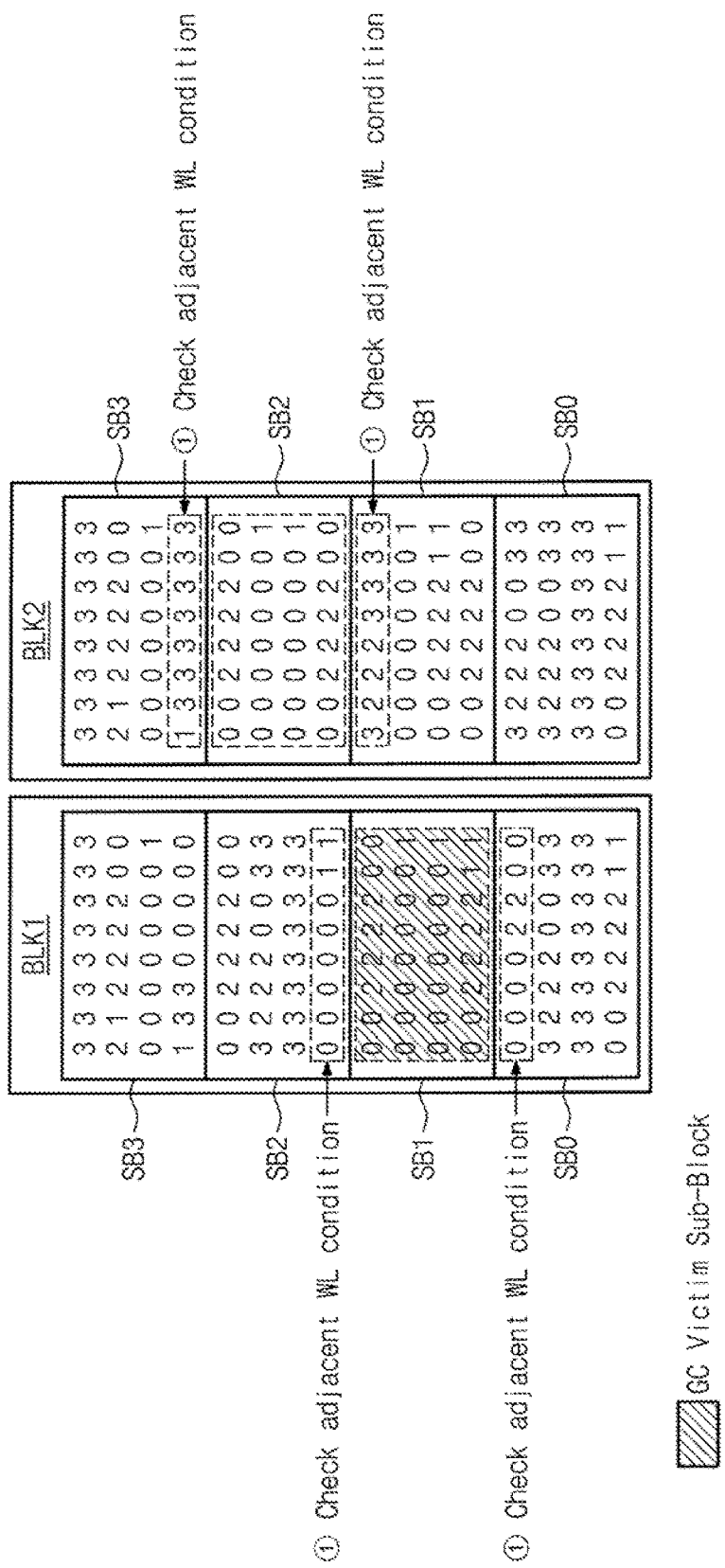
FIG. 10 is a drawing for explaining an operation of a storage device of FIG. 9.

FIG. 10 is a drawing for explaining an operation of a storage device of FIG. 9. An operation of the storage device 300 will be described with reference to FIG. 9.

The adjacent word line condition checker 312 may count the number of valid pages of an adjacent word line. The adjacent word line condition checker 312 may apply weight generated by the weight generator 314 to count the number of valid pages.

The weight generator 314 may individually generate weight with respect to memory cells of an adjacent word line using weight information. The weight information may include condition information including program-erase cycle information of a memory cell and degradation of a memory cell. For example, the weight generator 314, if the number of times of a program-erase of a specific memory cell is great or greater than a predetermined number, may generate weight smaller than 1. In the case that degradation of a specific memory cell is severe, the weight generator 314 may generate weight of a corresponding memory cell as a value smaller than 1. The weight generator 314 may generate a proper weighting value according to a program-erase cycle of a memory cell and the degree of degradation of a memory cell.

The memory controller 310 selects a garbage collection victim sub-block using a condition of an adjacent word line checked by the adjacent word line condition checker 312. The memory controller 310 may select a sub-block having the smallest value among the number of valid pages of an adjacent word line counted by the adjacent word line condition checker 312 as a victim sub-block. The memory controller 310 may select a sub-block having the smallest value among values of valid pages of an adjacent word counted by the adjacent word line condition checker 312 counts assigning weight as a victim sub-block. The memory controller 310 erases the selected victim sub-block to generate a free sub-block.

As described above, the storage device 300 selects a garbage collection victim sub-block using only a condition of an adjacent word line. On the contrary, the storage devices 100 and 200 described above selects a garbage collection victim sub-block considering the number of valid pages of a sub-block and the number of valid pages of an adjacent word line together. The storage device 300 selects a garbage collection victim sub-block using only a condition of an adjacent word line, thereby reducing an error due to an interference phenomenon caused by an erase operation of the sub-block. For example, in the case of minimizing an error due to a word line interference phenomenon, the storage device 300 may be used.

Figure 11:
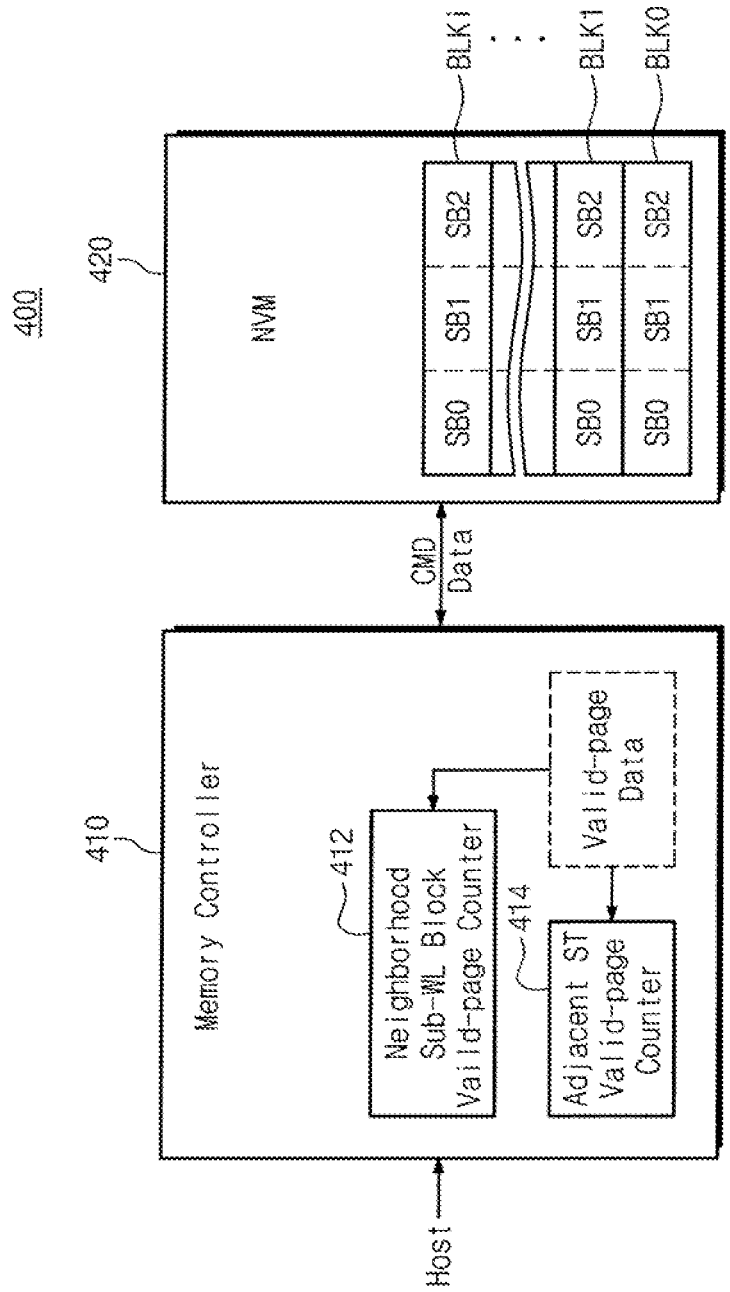
FIG. 11 is a block diagram illustrating a storage device in accordance with an exemplary embodiment of the inventive concept.
Figure 13:
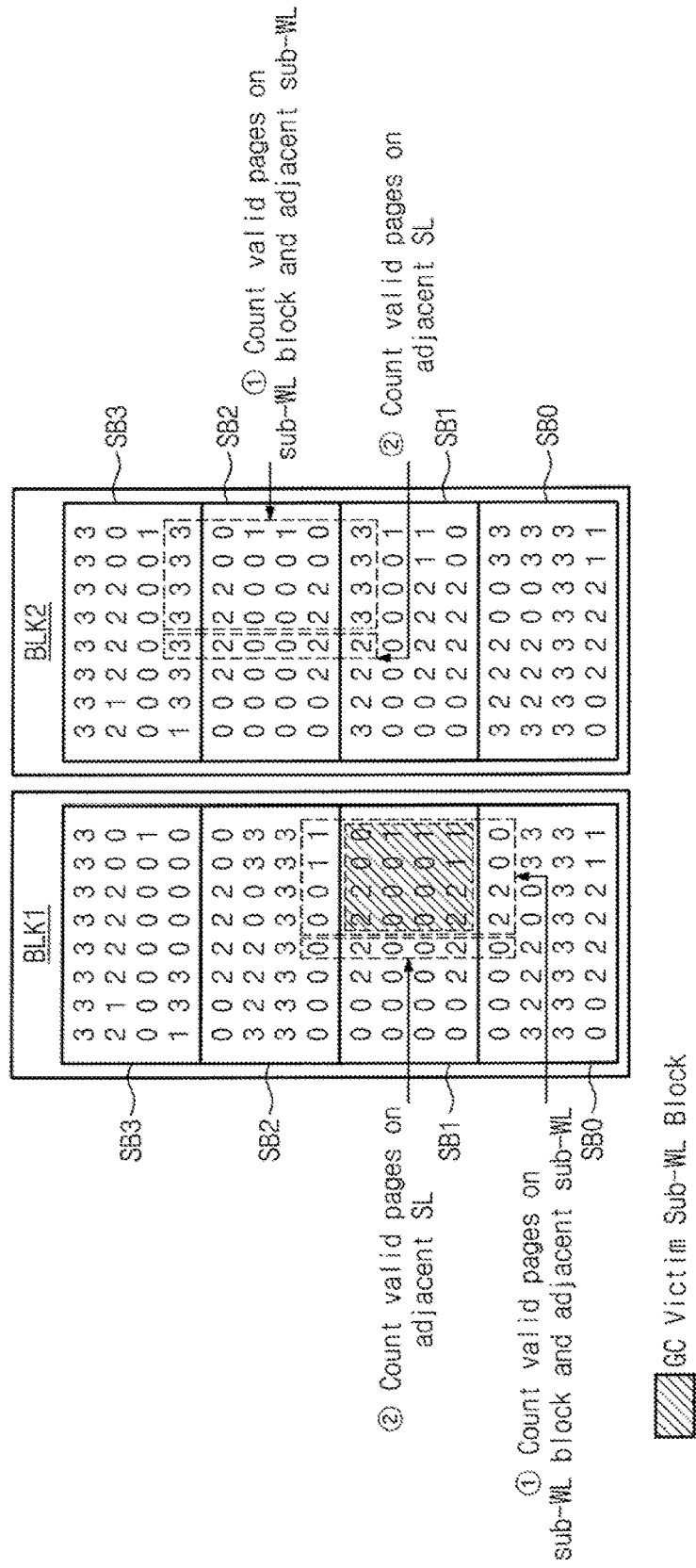
FIG. 13 is a drawing for explaining a garbage collection victim sub-word line block selection operation in accordance with an exemplary embodiment of the inventive concept.

FIG. 11 is a block diagram illustrating a storage device in accordance with an exemplary embodiment of the inventive concept. Referring to FIG. 11, a storage device 400 includes a memory controller 410 and a nonvolatile memory device 420. The memory controller 410 may perform an erase operation of the nonvolatile memory device 420 by a sub-word line block unit. The sub-word line block means a block obtained by dividing a sub-block again on the basis of a sub-word line. Referring to FIG. 13, a sub-block is constituted by four word line layers and each word line layer includes eight sub-word lines. In this case, the sub-block may be divided into a total of two sub-word line blocks on left and right sides on the basis of four sub-word lines. When performing a garbage collection operation by a sub-word line block unit, the memory controller 410 may select a garbage collection victim sub-word line block with reference to the number of valid pages of an adjacent string.

Figure 12:
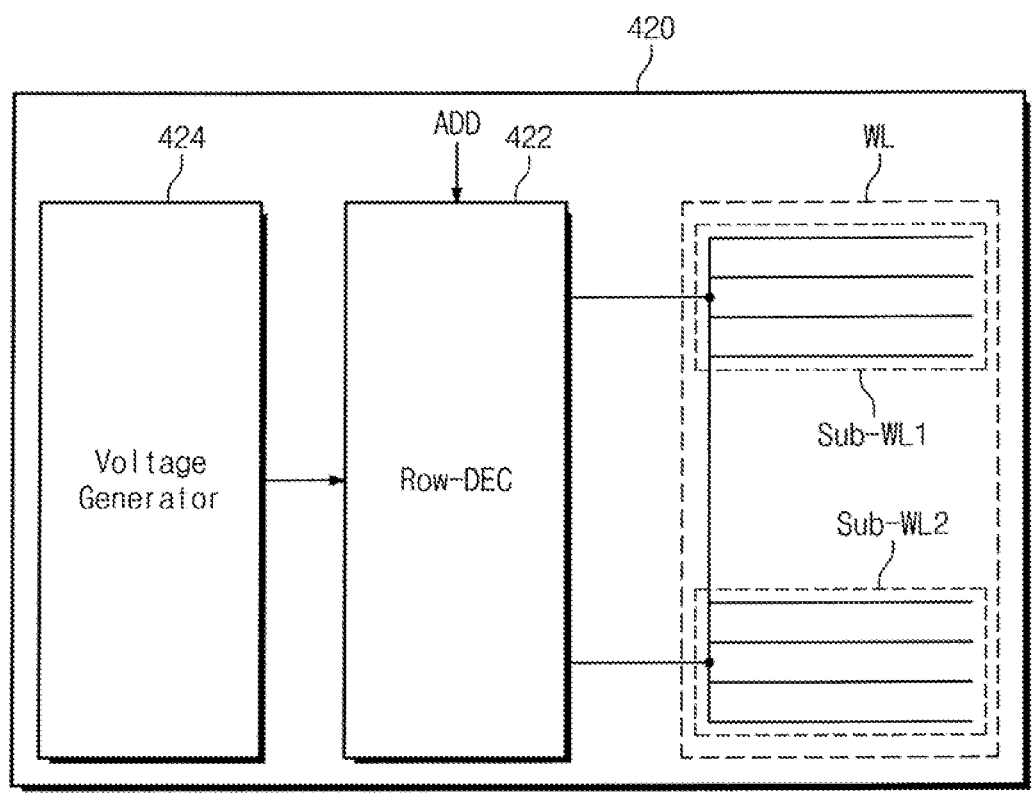
FIG. 12 is a block diagram illustrating a nonvolatile memory device of a storage device in accordance with an exemplary embodiment of the inventive concept.

FIG. 12 is a block diagram illustrating a nonvolatile memory device of a storage device in accordance with an exemplary embodiment of the inventive concept. Referring to FIG. 12, a nonvolatile memory device 420 may include a row decoder 422 and a voltage generator 424. A sub-word line block select operation is described with reference to FIG. 12.

The row decoder 422 provides voltages to select lines SSL and GSL and word lines to select a block by a sub-block unit in response to an address signal ADD. The row decoder 422 provides voltages to select lines SSL and GSL and word lines to select a sub-block by a plurality of a sub-word line block units in response to an address signal ADD. Referring to FIG. 12, the row decoder 422 may select a word line constituted by eight sub-word lines as two sub-word line blocks (sub-WL1, sub-WL2). For example, the row decoder 422 may select a memory block by a sub-block unit or a sub-word line block unit. The sub-word line block is a block obtained by classifying the sub-block based on the sub-word line again.

The voltage generator 424 generates various types of word line voltages to be provided to each word line and a voltage to be provided to a bulk (for example, a well region) in which memory cells are formed under the control of the control logic. Examples of word line voltages to be provided to word lines include a program voltage, a pass voltage, and select and unselect read voltages.

FIG. 13 is a drawing for explaining a garbage collection victim sub-word line block selection operation in accordance with an exemplary embodiment of the inventive concept. An operation of the storage device 400 is described below with reference to FIGS. 11 and 13. [Note to client: FIG. 12?]

The memory controller 410 includes a neighborhood sub-word line block valid-page counter 412 and an adjacent valid-page counter 414. The neighborhood sub-word line block valid-page counter 412 counts the number of valid pages of a sub-word line block and the number of valid pages of a sub-word line adjacent to the sub-word line block 0. Here, an adjacent sub-word line counting a valid page is a word line in which a word line interference phenomenon may occur by an erase operation.

The adjacent valid-page counter 414 counts the number of valid pages of a string adjacent to the sub-word line (②). In the case of dividing a sub-block into a plurality of sub-word line blocks to perform an erase operation, an interference phenomenon due to a coupling effect may occur in a string adjacent to the sub-word line block. For example, an interference phenomenon may occur in a string of an adjacent unselected sub-word line block by a voltage applied to the selected sub-word line block in an erase operation. That interference phenomenon may change a condition of information of a memory cell sharing a corresponding string. Thus, before and after the erase operation, reliability of information stored in a memory cell sharing an adjacent string may be reduced. The storage device 400 considers the number of valid pages of an adjacent word line and the number of valid pages of an adjacent string to reduce an error due to the string interference phenomenon.

The memory controller 410 adds the numbers of valid pages counted by the neighborhood sub-word line block valid-page counter 412 and the adjacent valid-page counter 414.

The memory controller 410 selects a sub-word line block having the minimum added number of valid pages as a garbage collection victim sub-word line block. After that, the memory controller 410 may erase the selected victim sub-word line block to generate a free sub-word line block.

According to exemplary embodiments of the inventive concept, an error due to an interference phenomenon of a string line that may additionally occur by an erase operation of a sub-word line block unit may be considered. For example, when selecting a garbage collection victim sub-word line block, the storage device 400 also considers the number of valid pages of an adjacent string line in which an error may occur.

Figure 14:
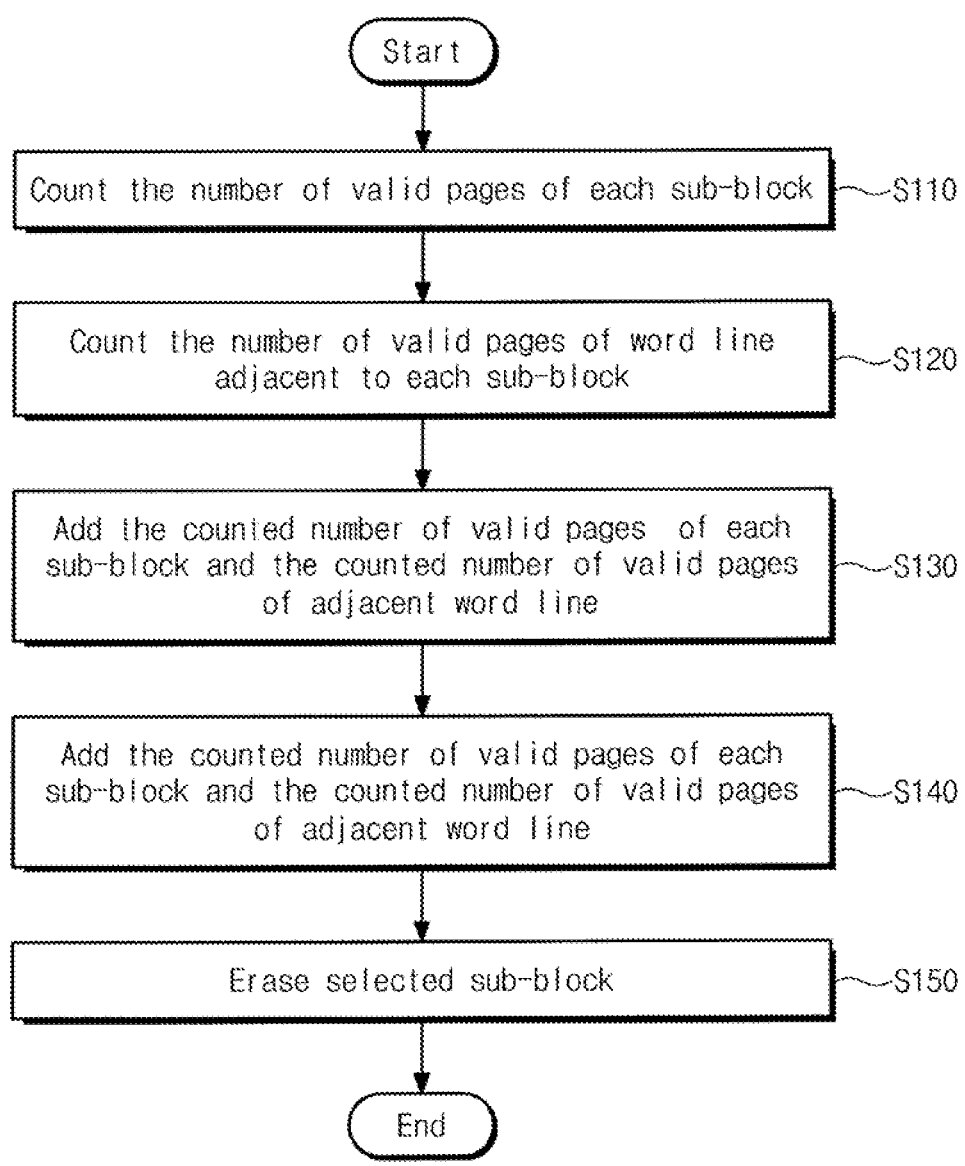
FIG. 14 is a flowchart illustrating a garbage collection method in accordance with exemplary embodiments of the inventive concept.

FIG. 14 is a flowchart illustrating a garbage collection method in accordance with an exemplary embodiment of the inventive concept. Referring to FIG. 14, a garbage collection victim sub-word line block is selected considering the number of valid pages of a sub-block and the number of valid pages of a word line adjacent to the sub-block together. The adjacent word line counting the number of valid pages is a word line in which a word line interference phenomenon caused by an erase operation occurs.

In a step S110, the sub-block valid-page counter 112 of the memory controller 110 counts the number of valid pages of sub-blocks with reference to valid page information.

In a step S120, the adjacent word line valid-page counter 114 of the memory controller 110 counts the number of valid pages of a word line adjacent to the sub block with reference to valid page information. The number of adjacent word lines counting the number of valid pages may be at least one. For example, if a word line interference phenomenon caused by an erase operation occurs in two successive adjacent word lines, the adjacent word line valid-page counter 114 counts the number of valid pages on two successive adjacent word lines.

In a step S130, the memory controller 110 adds a count value of the sub-block valid-page counter 112 and a count value of the adjacent word line valid-page counter 114.

In a step S140, the memory controller 110 selects a sub-block having the minimum added count value as a garbage collection victim sub-block.

In a step S150, the memory controller 110 erases the selected victim sub-block.

The memory controller 110 selects a garbage collection victim sub-block by considering a valid page of an adjacent word line in which a word line interference phenomenon occurs in a sub-block erase operation. By considering a valid page of an adjacent word line, valid information that has to be copied back due to a word line interference phenomenon may be reduced. Consequently, garbage collection time of the storage device 100 is reduced and write performance of the storage device 100 is increased.

Figure 15:
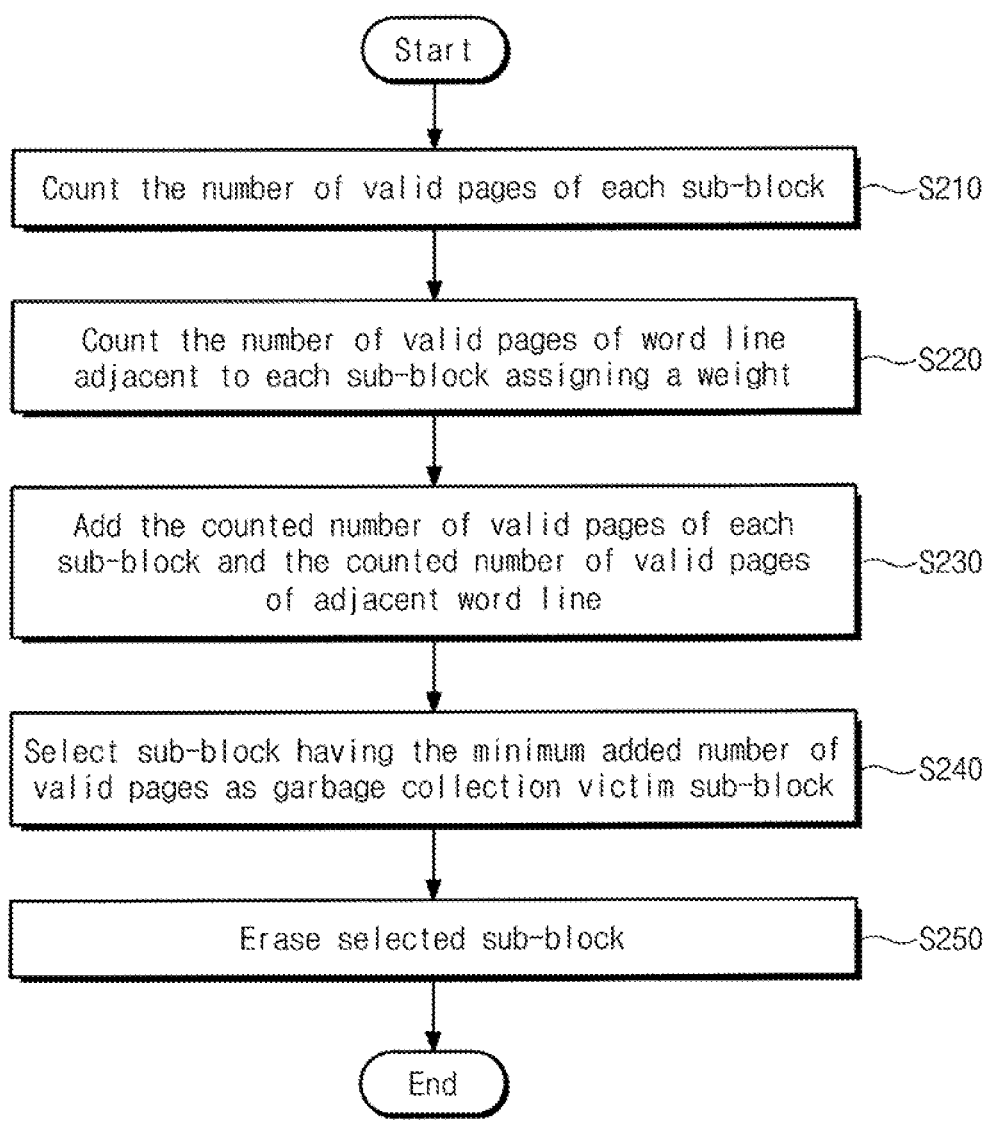
FIG. 15 is a flowchart illustrating a garbage collection method in accordance with an exemplary embodiment of the inventive concept.

FIG. 15 is a flowchart illustrating a garbage collection method in accordance with an exemplary embodiment of the inventive concept. Referring to FIG. 15, when counting a valid page of an adjacent word line, it is counted assigning a weight according to a condition of a word line and a word line interference compensation scheme. The information about the condition of the word line may be PE cycle information of a memory cell of a word line and degradation information of a word line.

In a step S210, the sub-block valid-page counter 112 of the memory controller 110 counts the number of valid pages of sub-blocks with reference to valid page information.

In a step S220, the adjacent word line valid-page counter 114 of the memory controller 110 counts the number of valid pages of a word line adjacent to the sub block assigning a weight with reference to valid page information. The weight is generated from the weight generator 116. The weight may be individually generated for each memory cell with reference to condition information. In an exemplary embodiment, the weight may be generated as a same value for each word line unit.

In a step S230, the memory controller 110 adds a count value of the sub-block valid-page counter 112 and a count value of the adjacent word line valid-page counter 114.

In a step S240, the memory controller 110 selects a sub-block having the minimum added count value as a garbage collection victim sub-block.

In a step S250, the memory controller 110 erases the selected victim sub-block.

According to exemplary embodiments of the inventive concept, the adjacent word line valid-page counter 114 counts a valid page of an adjacent word line assigning a weight generated according to a condition of an adjacent word line or an applied word line interference compensation scheme. For example, in the case that a weight is 1, if PE cycle information of a specific memory cell is greater than a predetermined number or degradation of a memory cell is severe, a weight may be smaller than 1. In the case that a weight is 1, the number of valid pages of a sub-block and the number of valid pages of an adjacent word line may be equally counted. In the case that a word line interference compensation scheme is based on a copy back scheme, a weight may be set to, for example, 1, and in the case of applying a more effective scheme than the copy back scheme, a weight may be smaller than 1. The more effective scheme than the copy back scheme may mean a word line interference compensation scheme having a high operation speed and a simple structure compared with the copy back scheme.

Figure 16:
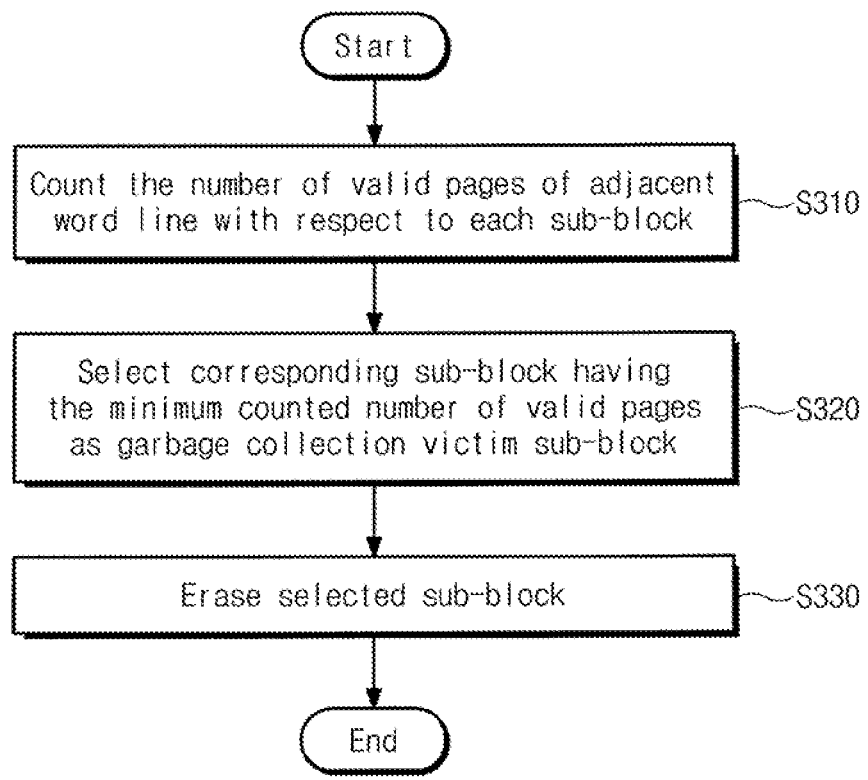
FIG. 16 is a flowchart illustrating a garbage collection method in accordance with an exemplary embodiment of the inventive concept.

FIG. 16 is a flowchart illustrating a garbage collection method in accordance with an exemplary embodiment of the inventive concept. Referring to FIG. 16, when selecting a garbage collection victim sub-block, only the number of valid pages of an adjacent word line is considered. In this case, in an erase operation of a sub-block, an error caused by word line interference may be minimized.

In a step S310, the adjacent word line valid-page counter 114 of the memory controller 110 counts the number of valid pages of an adjacent word line with respect to each sub-block with reference to valid page information. The adjacent word line is a word line in which a word line interference phenomenon occurs due to an erase operation. The adjacent word line valid-page counter 114 of the memory controller 110 may count the number of valid pages assigning the weight described above.

In a step S320, the memory controller 110 selects a sub-block surrounded by adjacent word lines having the minimum counted number of valid pages as a garbage collection victim sub-block.

In a step S330, the memory controller 110 erases the selected victim sub-block.

According to exemplary embodiments of the inventive concept, the memory controller 110 selects a sub-block having the minimum number of valid pages in a word line adjacent to the sub-block as a garbage collection victim sub-block. Thus, an error due to a word line interference phenomenon caused by an erase operation may be minimized.

Figure 17:
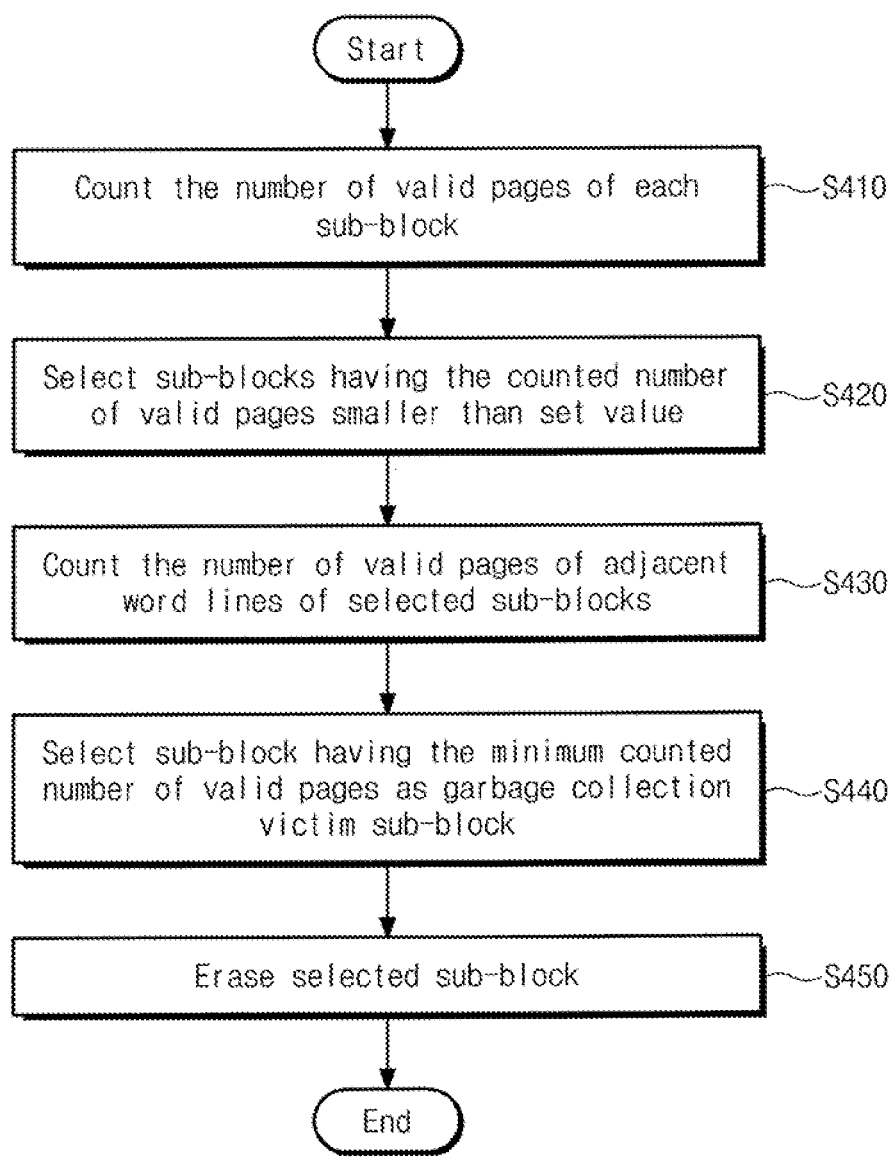
FIG. 17 is a flowchart illustrating a garbage collection method in accordance with an exemplary embodiment of the inventive concept.

FIG. 17 is a flowchart illustrating a garbage collection method in accordance with an exemplary embodiment of the inventive concept. Referring to FIG. 17, among sub-blocks in which the number of valid pages of a sub-block is smaller than a set value, a sub-block having the minimum number of valid pages of an adjacent word line is selected as a garbage collection victim sub-block.

In a step S410, the sub-block valid-page counter 112 of the memory controller 110 counts the number of valid pages of sub-blocks with reference to valid page information.

In a step S420, the memory controller 110 selects sub-blocks in which the counted number of valid pages is smaller than the set value. For example, in the case that the set value is 21, the memory controller 110 selects the sub-block SB1 of the memory block BLK1 and the sub-block SB2 of the memory block BLK2 that are illustrated in FIG. 5.

In a step S430, the adjacent word line valid-page counter 114 of the memory controller 110 counts the number of valid pages of an adjacent word line with respect to the sub-blocks selected in the step S420.

In a step S440, the memory controller 110 selects a sub-block having the minimum number of valid pages counted in the step S430 as a garbage collection victim sub-block.

In a step S450, the memory controller 110 erases the selected valid sub-block.

According to exemplary embodiments of the inventive concept, when selecting a garbage collection victim sub-block, a valid page of a sub-block and a valid page of an adjacent word line are considered at the same time. However, a final selection of the garbage collection victim sub-block is determined considering only a valid page of an adjacent word line. Thus, by considering the number of valid pages of a sub-block first and then considering the number of valid pages of an adjacent word line, a victim sub-block may be selected among sub-blocks having the relatively small number of valid pages. Since the victim sub-block finally selected is selected based on only the number of valid pages of an adjacent word line, an error that may occur in an adjacent word line due to an erase operation of the selected victim sub-block may be reduced.

Figure 18:
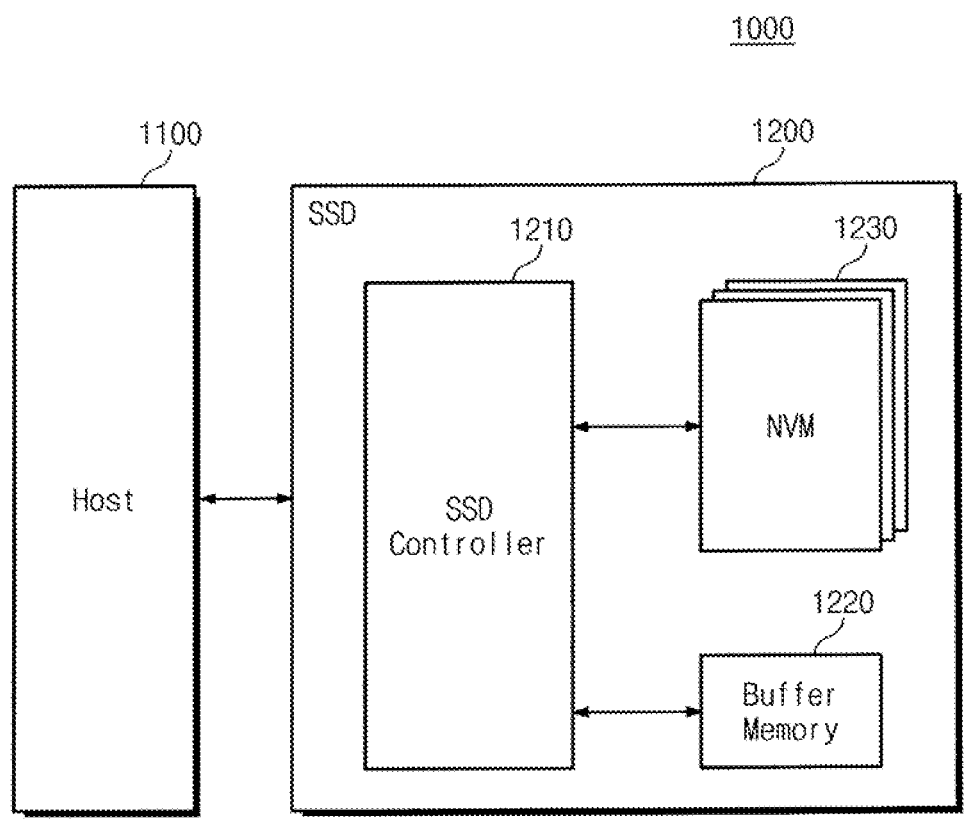
FIG. 18 is a block diagram illustrating a user device including a SSD in accordance with exemplary embodiments of the inventive concept.

FIG. 18 is a block diagram illustrating a user device including a SSD in accordance with exemplary embodiments of the inventive concept. Referring to FIG. 18, the user device 1000 includes a host 1100 and a SSD 1200. The SSD 1200 includes a SSD controller 1210, a buffer memory 1220 and a nonvolatile memory device 1230.

The SSD controller 1210 provides a connection between the host 1100 and the SSD 1200. The SSD controller 1210 provides an interface with the SSD 1200 in response to a bus format of the host 1100. In particular, the SSD controller 1210 decodes a command being provided from the host 1100. According to a decoded result, the SSD controller 1210 accesses the nonvolatile memory device 1230. Examples of the bus format of the host 1100 may include a universal serial bus (USB), a small computer system interface (SCSI), a PCI express, an ATA, a parallel ATA (PATA), a serial ATA (SATA), a serial attached SCSI (SAS), etc.

The buffer memory 1220 temporarily stores write information being provided from the host 1100 or information read from the nonvolatile memory device 1230. In the case that when a read request from the host 1100 occurs, information existing in the nonvolatile memory device 1230 is cached, the buffer memory 1220 supports a cache function of directly providing the cached information to the host 1100. Generally, an information transmission speed by the bus format (for example, SATA or SAS) of the host 1100 is greatly higher than a transmission speed of a memory channel of the SSD 1200. For example, in the case that an interface speed of the host 1100 is greatly high, performance degradation due to a speed difference may be minimized by providing the large capacity buffer memory 1220.

The buffer memory 1220 may be provided as a synchronous DRAM to provide a sufficient buffering in the SSD 1200 being used as an auxiliary memory device. However, the buffer memory 1220 is not limited thereto.

The nonvolatile memory device 1230 is provided as storage medium of the SSD 1200. For example, the nonvolatile memory device 1230 may be provided as a vertical NAND type flash memory having a high storage capacity. The nonvolatile memory device 1230 may be constituted by a plurality of memory devices. In this case, the memory devices are connected to the SSD controller 1210 by a channel unit. The nonvolatile memory device 1230 as storage medium is not limited to a NAND flash memory. Examples of storage medium may include PRAM, MRAM, ReRAM, FRAM, NOR flash memory, etc. A storage device in which different kinds of memory devices are mixed may be applied. The nonvolatile memory device 1230 may be constituted to be the same with that described in FIG. 3.

In the SSD 1200, the SSD controller 1210 may manage a memory block of the nonvolatile memory device 1230 by a sub-block unit. In the case that a garbage collection operation is performed by a sub-block unit, the SSD controller 1210 selects a garbage collection victim sub-block considering the number of valid pages of an adjacent word line together with the number of valid pages of a sub-block. For example, the SSD controller 1210 selects a garbage collection victim sub-block considering an interference phenomenon that may occur in an adjacent word line due to an erase operation of a sub-block unit.

Figure 19:
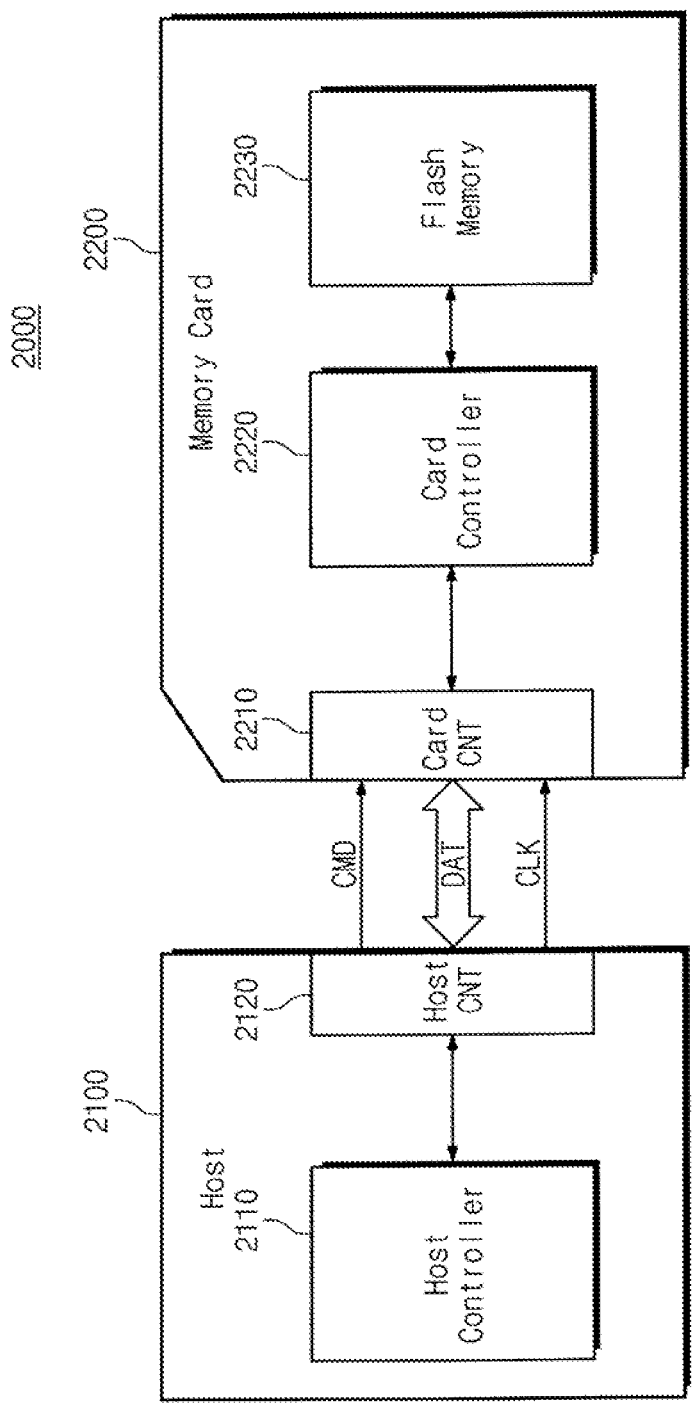
FIG. 19 is a block diagram illustrating a memory card in accordance with exemplary embodiments of the inventive concept.

FIG. 19 is a block diagram illustrating a memory card in accordance with exemplary embodiments of the inventive concept. Referring to FIG. 19, a memory card system 2000 includes a host 2100 and a memory card 2200. The host 2100 includes a host controller 2110 and a host connection unit 2120. The memory card 2200 includes a card connection unit 2210, a card controller 2220 and a flash memory 2230.

The host connection unit 2120 and the card connection unit 2210 are constituted by a plurality of pins. The pins may include a command pin, information pin, a clock pin, a power pin, etc. The number of pins may become different depending on the type of memory card 2200. For example, a SD card may have 9 pins.

The host 2100 writes information in the memory card 2200 or reads information stored in the memory card 2200. The host controller 2110 transmits a command (for example, write command), a clock signal CLK generated in a clock generator (not shown) inside the host 2100, and information DAT to the memory card 2200 through the host connection unit 2120.

In response to a write command received through the card connection unit 2210, the card controller 2220 stores information in the flash memory 2230 in synchronization with a clock signal generated in a clock generator (not shown) inside the card controller 2220. The flash memory 2230 stores information transmitted from the host 2100. For example, in the case that the host 2100 is a digital camera, the flash memory 2230 stores image information.

The flash memory 2230 may include memory cells vertically being stacked on a substrate. The flash memory 2230 may erase memory cells by a sub-block unit.

The card controller 2220 may detect an erase state or an erase prohibit state by a sub-block unit of the flash memory 2230. The card controller 2220 may manage a memory block of the flash memory 2230 by a sub-block unit. Specifically, in the case that a garbage collection operation is performed by a sub-block unit, the card controller 2220 selects a garbage collection victim sub-block considering the number of valid pages of an adjacent word line together with the number of valid pages of a sub-block. For example, the card controller 2220 selects a garbage collection victim sub-block considering an interference phenomenon that may occur in an adjacent word line due to an erase operation of a sub-block unit.

The card connection unit 2210 may be configured to communicate with the outside (for example, a host) through one of various interface protocols such as USB, MMC, PCI-E, SAS, SATA, PATA, SCSI, ESDI, and IDE.

Figure 20:
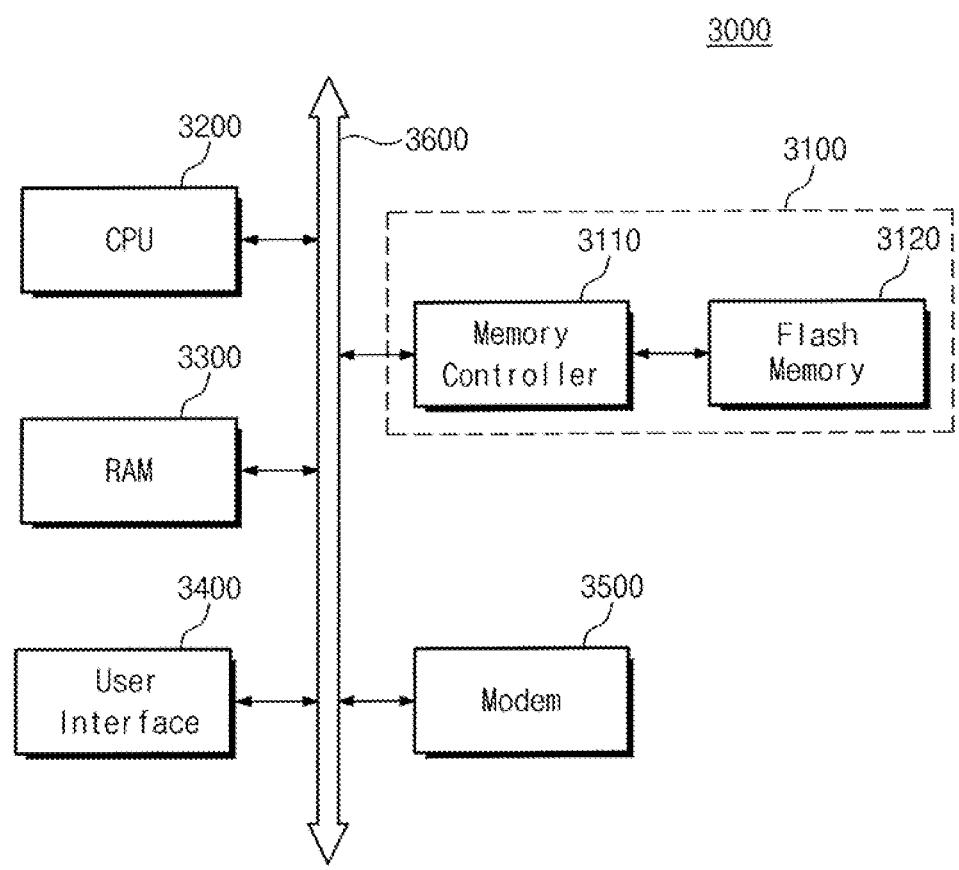
FIG. 20 is a block diagram illustrating a computing system in accordance with exemplary embodiments of the inventive concept.

FIG. 20 is a block diagram illustrating a computing system 3000 including a flash memory device 3120. The computing system 3000 includes a microprocessor 3200, a RAM 3300, a user interface 3400, a modem 3500 such as a baseband chipset, and a storage device 3100 that are electrically connected to a system bus 3600. The storage device 3100 may be constituted to be the same with the SSD 1200 of FIG. 18 and the memory card 2200 of FIG. 19. In the case that the computing system 3000 is a mobile device, a battery (not shown) for supplying an operation voltage of the computing system 3000 may be additionally provided.

Although not illustrated in the drawing, the computing system 3000 may further include an application chipset, a CIS (camera image processor), a mobile DRAM, etc. The storage device 3100 may constitute a SSD (solid state drive/disk) using a nonvolatile memory when storing information. The storage device 3100 may be provided as a fusion flash memory (for example, one NAND flash memory).

A memory controller 3110 may manage a memory block of a flash memory device 3120 by a sub-block unit. Specifically, in the case that a garbage collection operation is performed by a sub-block unit, the memory controller 3110 selects a garbage collection victim sub-block considering the number of valid pages of an adjacent word line together with the number of valid pages of a sub-block. For example, the memory controller 3110 selects a garbage collection victim sub-block considering an interference phenomenon that may occur in an adjacent word line due to an erase operation of a sub-block unit.

The nonvolatile memory device and/or the memory controller may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

According to the inventive concept, write performance is improved by reduction of a garbage collection time in a storage device performing an erase operation by a sub-block unit.

According to the inventive concept, reliability of a storage device is improved by reduction of an error due to adjacent word line interference caused by an erase operation of a sub-block unit.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A storage device comprising:
   a nonvolatile memory device including a plurality of blocks,
   wherein each block includes a plurality of sub-blocks,
   wherein each block comprises cell strings disposed on a substrate,
   wherein each of the cell strings includes at least one select transistor and memory cells stacked in a direction perpendicular to the substrate,
   wherein each of the at least one select transistor and the memory cells comprises a charge trap layer,
   wherein memory cells of each block form the plurality of the sub-blocks, and
   wherein each sub block is erased independently; and
   a memory controller performing a garbage collection operation on the nonvolatile memory device by
   selecting a garbage collection victim sub-block among the sub-blocks and
   erasing the selected garbage collection victim sub-block to generate a free sub-block,
   wherein the memory controller selects the garbage collection victim sub-block using a number of valid pages of a sub-block of the plurality of the sub-blocks and a number of valid pages of memory cells in word lines adjacent to the sub-block,
   wherein the memory cells in word lines adjacent to the sub-block comprise a portion of memory cells included in at least one other sub-block adjacent to the sub-block.

2. The storage device of claim 1,
   wherein the memory controller calculates a number of valid pages of each sub-block and selects a sub-block having a minimum number of valid pages, and
   wherein the number of valid pages of each sub-block is a sum of the number of valid pages of each sub-block and the number of valid pages of memory cells in word lines adjacent to each sub-block.

3. The storage device of claim 2,
   wherein the number of valid pages of the memory cells in word lines adjacent to each sub-block is calculated using a weight, and
   wherein the weight is determined based on condition information of the memory cells in word lines adjacent to each sub-block or based on how closely each sub-block and the memory cells in word lines adjacent to each sub-block are located.

4. The storage device of claim 3,
wherein the condition information comprises program-erase cycle information of the memory cells or degradation information of the memory cells.

5. The storage device of claim 2,
wherein the memory controller includes a weight generator generating a weight according to an interference compensation scheme applied to the storage device, and
wherein the interference compensation scheme includes a copy back scheme or a post-recharge scheme.

6. The storage device of claim 5,
wherein if the interference compensation scheme is the copy back scheme,
the number of valid pages of the adjacent memory cells are calculated using the same weight.

7. The storage device of claim 2,
wherein the memory controller includes a weight generator generating a weight according to a number of times of erases of each sub-block, and
wherein the number of the valid pages of each sub-block is calculated using the weight of each sub-block.

8. The storage device of claim 1,
wherein each block includes a plurality of memory cells stacked in a direction perpendicular to a substrate.

9. A garbage collection method of a nonvolatile memory device having a plurality of blocks, each block including a plurality of sub-blocks,
wherein each block comprises cell strings disposed on a substrate,
wherein each of the cell strings includes at least one select transistor and memory cells stacked in a direction perpendicular to the substrate,
wherein each of the at least one select transistor and the memory cells comprises a charge trap layer,
wherein memory cells of each block comprise the plurality of the sub-blocks, comprising:
counting a first number of valid pages of each sub-block in each block;
counting a second number of valid pages of memory cells connected to some of word lines that are connected to cell strings of one side of at least one other sub-block adjacent to each sub-block;
calculating a number of valid pages of each sub-block by adding the first number of each sub-block to the second number of word lines adjacent to each sub-block;
selecting a sub-block having a minimum number of valid pages as a garbage collection victim sub-block; and
erasing the garbage collection victim sub-block.

10. The garbage collection method of claim 9,
wherein counting the first number includes applying a first weight in the counting of the first number, and counting the second number includes applying a second-weight in the counting of the second number.

11. The garbage collection method of claim 10,
wherein the second weight is set according to condition information of memory cells of each of the adjacent word lines.

12. The garbage collection method of claim 11, wherein the condition information comprises program-erase cycle information or degradation information.

13. The garbage collection method of claim 10, wherein the second weight is individually set for each memory cell of the adjacent word lines or the second weight is set to a same value for each adjacent word line of the plurality of the adjacent word lines.

14. The garbage collection method of claim 10,
wherein the first weight and the second weight are set according to an interference compensation scheme applied to the nonvolatile memory device.

15. A garbage collection method of a nonvolatile memory device including a plurality of blocks, each block including a plurality of sub-blocks,
wherein each block comprises cell strings disposed on a substrate,
wherein each of the cell strings includes at least one select transistor and memory cells stacked in a direction perpendicular to the substrate,
wherein each of the at least one select transistor and the memory cells comprises a charge trap layer,
wherein memory cells of each block comprise the plurality of the sub-blocks, comprising:
counting a first number of valid pages of each sub-block;
selecting at least one first sub-blocks from the plurality of sub-blocks, wherein a number of valid pages of each first sub-block is smaller than a set value;
counting a second number of valid pages of memory cells adjacent to each of the at least one first sub-block, wherein the memory cells adjacent to each of the at least one first sub-block are connected to some of word lines that are connected to cell strings of at least one other sub-block adjacent to each of the at least one first sub-block;
calculating a number of valid pages of each of the at least one first sub-blocks by adding the first number of each of the at least one first sub-blocks and the second number of the memory cells in word lines adjacent to each of the at least one first sub-block;
selecting a first sub-block having a minimum number of valid pages as a garbage collection victim sub-block; and
erasing the garbage collection victim sub-block.

16. The garbage collection method of claim 15,
wherein the memory cells in word lines adjacent to each of the at least one first sub-blocks are associated with at least one word lines.

17. The garbage collection method of claim 16,
wherein a number of at least one word lines is set to a predetermined number, and
wherein the at least one word lines are subject to interference caused by an erase operation of each of the at least one first sub-blocks.

18. The garbage collection method of claim 15,
wherein each sub-block is independently erased and each block is independently erased.

* * * * *